US010089197B2

(12) United States Patent
Cheng et al.

(10) Patent No.: US 10,089,197 B2
(45) Date of Patent: Oct. 2, 2018

(54) LEVERAGE OFFLOAD PROGRAMMING MODEL FOR LOCAL CHECKPOINTS

(71) Applicant: Intel Corporation, Santa Clara, CA (US)

(72) Inventors: Shiow-wen Wendy Cheng, Portland, OR (US); Robert J. Woodruff, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 329 days.

(21) Appl. No.: 14/571,736

(22) Filed: Dec. 16, 2014

(65) Prior Publication Data

US 2016/0170849 A1 Jun. 16, 2016

(51) Int. Cl.
*G06F 11/20* (2006.01)
*G06F 9/52* (2006.01)
*G06F 9/50* (2006.01)

(52) U.S. Cl.
CPC ........ *G06F 11/2025* (2013.01); *G06F 9/5027* (2013.01); *G06F 9/52* (2013.01);
(Continued)

(58) Field of Classification Search
CPC ............. G06F 11/2033; G06F 11/2023; G06F 11/2025; G06F 11/203; G06F 9/3861
(Continued)

(56) References Cited

U.S. PATENT DOCUMENTS 7,526,577 B2 * 4/2009 Pinkerton ........... H04L 12/4641
 370/229
7,779,298 B2 * 8/2010 Challenger ......... G06F 11/1482
 714/13
(Continued)

FOREIGN PATENT DOCUMENTS

JP 2004-295656 A 10/2004
JP 2006-139621 A 6/2006
(Continued)

OTHER PUBLICATIONS

Newborn, et al., "Offload Compiler Runtime for the Intel® Xeon Phi Coprocessor", IPDPSW, 2013, IEEE International Symposium on Parallel & Distributed Processing, Workshops and Phd Forum (IPDPSW), 2013, pp. 1213-1225.
(Continued)

*Primary Examiner* — Elmira Mehrmanesh
(74) *Attorney, Agent, or Firm* — Law Office of R. Alan Burnett, P.S

(57) ABSTRACT

Methods, apparatus, and systems for leveraging an offload programming model for local checkpoints. Compute entities in a computing environment are implemented as one or more sources and a larger number of sinks. A job dispatcher dispatches jobs comprising executable code to the source(s), and the execution of the job code is managed by the source(s). Code sections in the job code designated for offload are offloaded to the sinks by creating offload context information. In conjunction with each offload, an offload object is generated and written to storage. The offloaded
(Continued)

code sections are executed by the sinks, which return result data to the source, e.g., via a direct write to a memory buffer specified in the offload context information. The health of the sinks is monitored to detect failures, and upon a failure the source retrieves the offload object corresponding to the code section offloaded to the failed sink, regenerates the offload context information for the code section and sends this to another sink for execution.

25 Claims, 15 Drawing Sheets

(52) U.S. Cl.
CPC ...... *G06F 11/203* (2013.01); *G06F 2201/805* (2013.01); *G06F 2209/509* (2013.01)

(58) Field of Classification Search
USPC .......................................................... 714/11
See application file for complete search history.

(56) References Cited

U.S. PATENT DOCUMENTS

| 8,099,627 | B1 | 1/2012 | Shah et al. | |
|---|---|---|---|---|
| 8,214,686 | B2* | 7/2012 | Ueda | G06F 11/1438 714/15 |
| 8,381,212 | B2* | 2/2013 | Brelsford | G06F 9/4843 709/201 |
| 8,874,961 | B2* | 10/2014 | Pillai | G06F 11/2023 709/223 |
| 9,378,063 | B2* | 6/2016 | Canoy | G06F 9/505 |
| 2003/0158906 | A1* | 8/2003 | Hayes | G06F 9/5027 709/211 |
| 2004/0098371 | A1 | 5/2004 | Bayliss et al. | |
| 2005/0034127 | A1* | 2/2005 | Phenix | G06F 9/5027 718/100 |
| 2005/0081097 | A1 | 4/2005 | Bacher et al. | |
| 2007/0192597 | A1* | 8/2007 | Bade | G06F 21/57 713/167 |
| 2007/0234342 | A1* | 10/2007 | Flynn, Jr. | G06F 9/4856 717/174 |
| 2010/0122199 | A1* | 5/2010 | Darrington | G06F 11/1438 715/771 |
| 2010/0122256 | A1* | 5/2010 | Darrington | G06F 9/485 718/102 |
| 2010/0262971 | A1* | 10/2010 | Yamada | G06F 9/505 718/104 |

FOREIGN PATENT DOCUMENTS

| JP | 2006-277696 A | 10/2006 |
|---|---|---|
| KR | 10-2013-0107361 A | 10/2013 |
| WO | 2013/101142 A1 | 7/2013 |

OTHER PUBLICATIONS

NVIDIA, "CUDA", Parallel Programming and Computing Platform, 2015, 5 pages.
AMD, "What is Heterogeneous System Architecture (HSA)?", retrieved on Mar. 11, 2015, 6 pages.
LLNL-WEB, "SLURM Checkpoint/Restart with BLCR", SLURM@LLNL, V2.3, Jul. 2008, 3 pages.
Office Action Received for Korean Patent Application No. 10-2015-0159979 , dated Jul. 19, 2016, 8 pages(1 page of English Translation and 7 pages of Korean Office Action).
Extended European Search report received for European Patent Application No. 15194404.8, dated Apr. 21, 2016, 11 pages.
Office Action received for Japanese Patent Application No. 2015-217587, dated Dec. 6, 2016, 11 pages of Japanese Office Action including 5 Pages of English Translation.
Miyamoto et al., "Offload Scheduler for High System Utilization on Xeon Phi Server", © Information Processing Society of Japan, Computer System Symposium, 2013, pp. 4-13 (English Abstract Included).

\* cited by examiner

```
// Get the number of KNF engines
uint32_t    num_engines = 0;
COIEngineGetCount(COI_ISA_KNF,
        &num_engines);       // The type of engine.
                             // Outparam for number of engines
                             // of this type.

// Get a handle to the first one
COIENGINE engine;
COIEngineGetHandle(COI_ISA_KNF,   // The type of engine.
        0,                        // The index of the engine within
                                  // the array of engines of this
                                  // type.
        &engine);                 // Outparam for the engine handle.
```

*Fig. 11*

Source-side Code

```
// Create a process
COIPROCESS process;
COIProcessCreateFromFile(engine,         // Engine on which to
                                         //   create the process.
                         "sink_exe",     // ELF executable file.
                         0, NULL,        // argc/argv.
                         false, NULL,    // Environment variables.
                         false, NULL,    // Proxy I/O setup.
                         1024 * 1024 * 1024,  // Space for buffers
                         NULL,           // Don't override the sink
                                         //   library search path
                         &process);      // Outparam for the
                                         //   process handle.

// Get a handle to a function
COIFUNCTION function;
COIProcessGetFunctionHandles(process,    // Process to query.
                             1,          // Lookup one function
                             (const char*[]){"sink_fn"},  // Name of function for which
                                         //   we want a handle.
                             &function); // Outparam for the function
                                         //   handle.

int8_t sink_return;
COI_SHUTDOWN_REASON exit_reason;
COIProcessDestroy(process,               // Already created process
                  -1,                    // Wait forever for the process to exit
                  false,                 // Don't forcibly kill the process
                  &sink_return,          // Get the return value from main
                  &exit_reason);         // Find out why the process exited
```

*Fig. 12a*

Sink-side Code

```
int main(int argc, char** argv)
{
    COIPipelineStartExecutingRunFunctions();   // Start executing run
                                                // functions.

COIProcessWaitForShutdown();                // Wait for the source
                                                // to call
                                                // COIProcessDestroy.

return 0;
} void sink_fn(uint32_t, void**, uint64_t*, void*,
             uint16_t, void*, uint16_t);
```

*Fig. 12b*

Source-side Code

```
// Create a normal buffer
COIBUFFER buffer;
COIBufferCreate(1024 * 1024,            // Size of the buffer.
                COI_BUFFER_NORMAL,      // Buffer type.
                0,                      // No flags.
                NULL,                   // Initial data.
                1, &process,            // Use it with our only process.
                &buffer);               // Outparam for buffer handle.

// Map the buffer
char* data;
COIMAPINSTANCE mi;
COIBufferMap(buffer,                    // Buffer to map.
             0, 0,                      // Offset and length.
             COI_MAP_READ_WRITE,        // Permissions when mapped.
             0, NULL,                   // No dependencies.
             NULL,                      // Completion event.
             &mi,                       // Handle to this map operation
             (void**)&data);            // Outparam with data pointer.

// Fill the data
sprintf(data, "Hello world!\n");

// Unmap the buffer
COIBufferUnmap(mi);

// Call a run function with the buffer
COI_ACCESS_FLAGS flags = COI_SINK_READ;
COIPipelineRunFunction(pipeline, function,
                       1,               // One buffer.
                       &buffer,         // Here's the buffer.
                       &flags,          // Buffer flags.
                       0, NULL, NULL, 0, NULL, NULL);
```

*Fig. 13a*

Sink-side Code

```
void sink_fn(
    uint32_t    in_BufferCount,
    void**      in_ppBufferPointers,
    uint64_t*   in_pBufferLengths,
    void*       in_pMiscData,
    uint16_t    in_MiscDataLength,
    void*       in_pReturnValue,
    uint16_t    in_ReturnValueLength)
{
    printf((char*)(in_ppBufferPointers[0]));  // Print the data in the
                                              // first buffer.
}
```

*Fig. 13b*

LEVERAGE OFFLOAD PROGRAMMING MODEL FOR LOCAL CHECKPOINTS

BACKGROUND INFORMATION

High-performance computing (HPC) has seen a substantial increase in usage and interests in recent years. Historically, HPC was generally associated with so-called "Super computers." Supercomputers were introduced in the 1960s, made initially and, for decades, primarily by Seymour Cray at Control Data Corporation (CDC), Cray Research and subsequent companies bearing Cray's name or monogram. While the supercomputers of the 1970s used only a few processors, in the 1990s machines with thousands of processors began to appear, and more recently massively parallel supercomputers with hundreds of thousands of "off-the-shelf" processors have been implemented.

There are many types of HPC architectures, both implemented and research-oriented, along with various levels of scale and performance. However, a common thread is the interconnection of a large number of compute units (also referred to as compute entities or compute entities herein), such as processors and/or processor cores, to cooperatively perform tasks in a parallel manner. Under recent System on a Chip (SoC) designs and proposals, dozens of processor cores or the like are implemented on a single SoC, using a 2-dimensional (2D) array, torus, ring, or other configuration. Additionally, researchers have proposed 3D SoCs under which 100's or even 1000's of processor cores are interconnected in a 3D array. Separate multicore processors and SoCs may also be closely-spaced on server boards, which, in turn, are interconnected in communication via a backplane or the like. Another common approach is to interconnect compute units in racks of servers (e.g., blade servers and modules). IBM's Sequoia, alleged to have once been the world's fastest supercomputer, comprises 96 racks of server blades/modules totaling 1,572,864 cores, and consumes a whopping 7.9 Megawatts when operating under peak performance.

HPC enables the workload for solving a complex job or task to be distributed across multiple compute entities using a parallel processing approach; this may entail use of thousands or even 100's of thousands of entities. In view of the statistical distribution of entity failures, as the number of entities employed for an HPC job increases, the rate at which a entity failure will occur during the HPC job increases exponentially. This exponential failure rate has become a hot issue among the HPC community, as well as commercial cloud service providers.

To address the possibility of entity failures, HPC jobs are performed in a manner that enables recovery from such failures without having to redo the job (or significant portions of the job). This is commonly done through a checkpoint-restart scheme. Under one conventional approach, checkpoints are taken periodically at frequent rates (the time period between checkpoints is known as an epoch) and a synchronized manner, wherein for each epoch processing on all entities in a checkpoint group is halted, a checkpoint operation is performed on each entity, and the entities are restarted. The granularity of the checkpoint groups is fairly course, and may involve 100's or 1000's of entities.

During each checkpoint, data is written to some form of non-volatile storage (e.g., a mass storage device or array of such devices assessed over a network). The data include both job processing state information and data produced as output via execution of software on each entity. This results in a substantial amount of storage consumption and a significant percentage of overall processing bandwidth is effectively wasted. In some instances, the associated storage consumption and execution restrictions of this conventional checkpoint-restart strategy make the actual result less sustainable or even practical.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 11 is a pseudo code listing of instructions used to get the number of engines in a MIC and get a handle to a first engine;

FIGS. 12a and 12b respectively show exemplary source-side and sink-side pseudo code listings for offloading a function using a COI process; and FIGS. 13a and 13b respectively show exemplary source-side and sink-side pseudo code listings for setting up and using a buffer.

DETAILED DESCRIPTION

Figure 1:
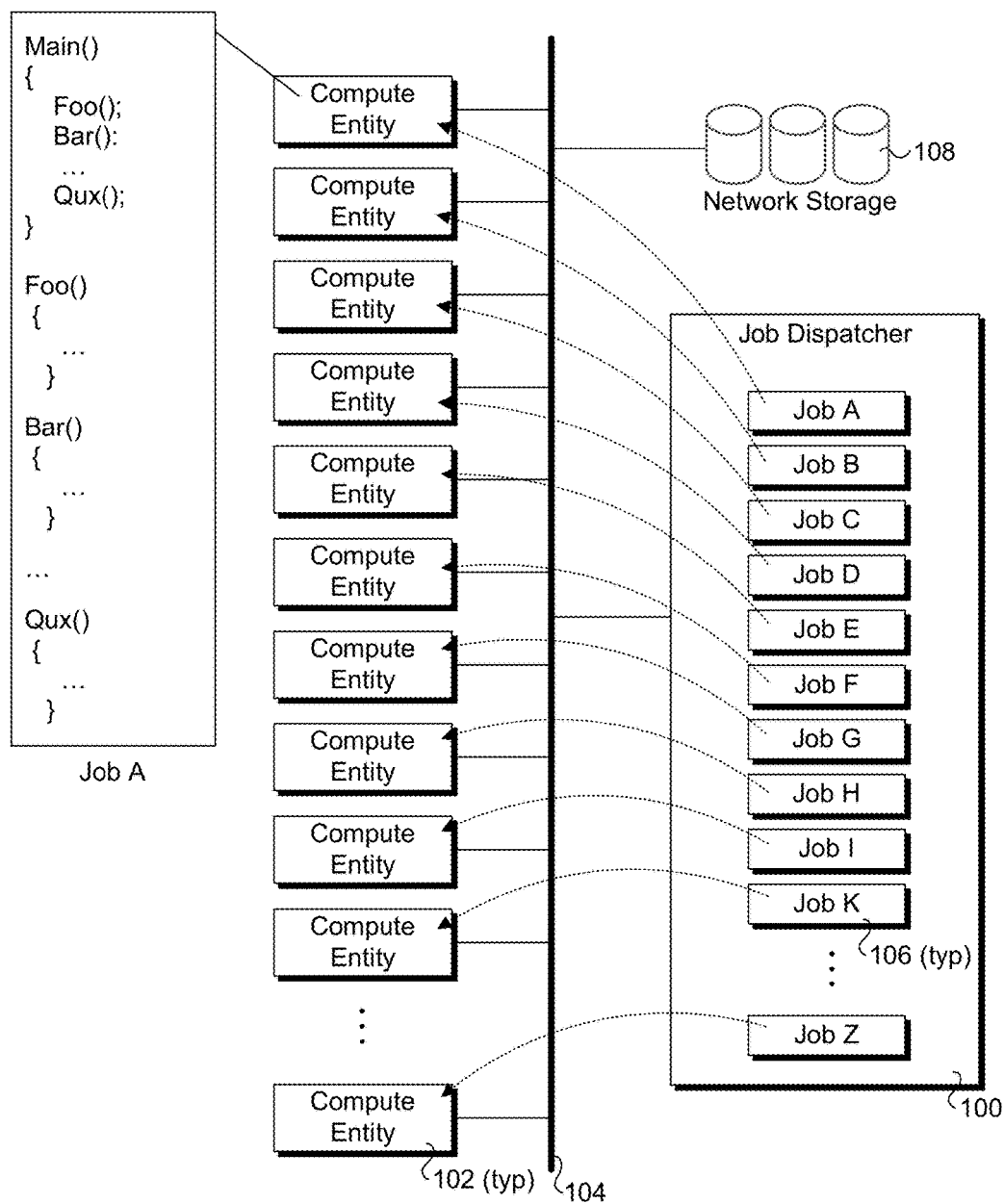
FIG. 1 is a schematic diagram illustrating a simplified view of a conventional parallel processing scheme used in HPC environments.

Embodiments of methods, apparatus, and systems for leveraging an offload programming model for local checkpoints are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Under the embodiments disclosed herein, and offload programming model is used in conjunction with a local checkpoint scheme that meets high reliability requirements while improving performance and reducing storage and/or network traffic associated with conventional checkpoints. In one aspect, the approach is advantageous for implementation in HPC environments, particularly for large-scale HPC jobs. It, however, also works extremely well with heterogeneous computing environment where the running entities can range from small hand-held devices all the way up to high capacity servers.

FIG. 1 shows a simplified view of a conventional parallel processing scheme used in HPC environments. As shown in FIG. 1, a job dispatcher 100 hosted by a first compute entity is coupled to multiple compute entities 102 via an interconnect 104. Generally, the HPC environment will be used to solve an overall job or task using a parallel-processing approach under which the overall job or task is divided into smaller jobs that are executed in parallel on a large number of compute entities. The job dispatcher is responsible for dispatching the smaller jobs to the compute entities and orchestrate checkpoints, as described below. Also, a large task may involve multiple job dispatchers that are configured in a hierarchy or the like. Aggregations of compute entities for a given level in the hierarchy may be referred to by various terms, such as cluster, job group, and others, although a job group might include multiple clusters.

Generally, a compute note may comprise any entity capable of executing software corresponding to a job or task. Compute entities include, but or not limited to, servers, computers, computing devices, processors, and cores in processors. Interconnect 104 is a generic interconnect that is representative of various types of interconnects including network links (e.g., Ethernet, InfiniBand, etc.), high-speed serial interconnects (e.g., Peripheral Component Interconnect Express (PCI Express or PCIe)), and interconnects within a processor System on a Chip (SoC). Moreover, in heterogeneous environment compute entities may be connected to job dispatchers and/or other compute entities via one or more interconnects, including interconnects of different types.

As further shown in FIG. 1, job dispatcher 100 dispatches jobs 106 to respective compute entities 102. Generally, each job 106 may comprise executable code that is to be executed by the compute entity. A job 106 may also include data to be operated on and/or the code itself may refer to data to be retrieved from storage by the compute entity, manipulated via execution of the code, and then stored. For illustrative purposes, data is stored in network storage 108, which may comprise a single storage device, a storage array, or other storage means that is well-known in the art. A cluster of entities or the compute entities themselves may also include local storage in which job-related data is stored. In addition, various caching schemes may be employed to enhance system performance.

An abstract depiction of a job A allocated to a compute entity 102-1 is shown in FIG. 1. The job comprises executable code that includes a main loop including multiple functions labeled Foo( ) Bar( ) . . . and Qux( ). A given job may comprise a complete executable (e.g., a standalone application), or a may comprise a code module or the like. Under some implementations, a job dispatcher may first dispatch an executable or module to a compute entity, and subsequently send (or otherwise identify the location of) data to be operated on by that executable or module. For simplicity, a set of jobs 106 are shown as being dispatched to respective compute entities 102. In practice, new jobs may be dynamically generated while processing an overall job or task, and asynchronously dispatched to various compute entities. Under one common scheme, compute entities "advertise" their availability, and a job dispatcher dynamically determines which compute entities are sent a given job based on considerations such as availability, processing capability, and memory resources.

Due to the nature of a parallel-processing architecture, it is critical that all jobs successfully complete, or else the overall task will fail. Since the output of certain jobs feed the input of subsequent jobs, the failure of even a single compute entity may lead to an overall failure. There are various approaches for addressing this issue, including dispatching the same jobs to multiple entities and then using the first successful completion of the jobs for subsequent jobs. However, this approach is wasteful, as the processing bandwidth of entities that are working on jobs that don't complete first (from among other entities dispatched the same job) ultimately don't end up being used.

Another approach employs a periodic checkpoint/restart sequence. Under one conventional checkpoint scheme, the following operations are performed: First, a decision is made (e.g., by the dispatcher or an entity higher up in the hierarchy) to when and where a checkpoint should be taken. A "quiesce" request(s) is then issued to every running entity within the batched job. Before proceeding further, the process waits for all entities to acknowledge the quiesce request and suspend their running (or otherwise acknowledge they are in a suspended state). At this point, all entities write out their states (also referred to as "context") to storage. A second wait occurs during which all entities acknowledge completion of the storage writes. This results in a completion being signaled to the entities.

Following the signaling of the checkpoint completion, a restart sequence commences. First, the jobs are re-dispatched into new assigned entities (i.e., dispatched to new compute entities). Each entity then reads its saved context from storage and acknowledge their readiness to resume. A wait period ensues until all entities have acknowledged their readiness, at which point a resume signal is sent to each entity to resume.

The foregoing conventional approach has many problems, some of which get exacerbated with greater scaling. First, there is a large amount of network traffic overhead involved in just communicating the instructions to the entities and returning statuses. Second, there is a burst storage operation during each epoch when the context for each entity is saved. Typical network storage schemes have limited input/output (IO) bandwidth, and are incapable of providing simultaneous access to storage. Rather, each storage access request must be handled in a sequential manner, noting that various caching schemes are commonly used to improve performance. Also, writing out the context of each entity requires a significant amount of storage space, especially for large-scale jobs.

The aspects of the embodiments disclosed herein, a different approach is taken. The embodiments leverage an offload programming model that automatically and opportunistically defines proper checkpoints as compared with the manual insertions by application coders and/or operators under the conventional checkpoint/restart scheme. It also does not suspend running entities, which results in enhanced performance since processing bandwidth lost due to processor suspension no longer exists. The amount of synchronization, if any, is significantly reduced relative to the global and lengthy synchronization overhead under the conventional scheme. The state/context saving operations are decomposed and may be spread out through the overall job execution. This significantly reduces the burst storage IO operations that can compete for storage bandwidth as well as storage space.

Under one aspect, intelligent pre-planned storage setup is performed during domain formation. This allows optimal topology placement of compute entities and storage devices to address large parallel jobs scaling concerns. The size of the saved state/context is substantially smaller, as it does not require the complete process image to be stored. This results in using less storage space as well as better successful rate for restart(s).

Built on top of offload programming model, the disclosed approaches breaks down the batched jobs into smaller virtual workload domains. Each domain conducts its own local checkpoints. Moreover, the method can be implemented in a recursive manner. Inherited from the offload programming paradigm, the approaches are particularly favorable for heterogeneous computing environments where the clustered compute entities may consist of different CPU architecture and/or are supported by different operating systems.

Figure 2:
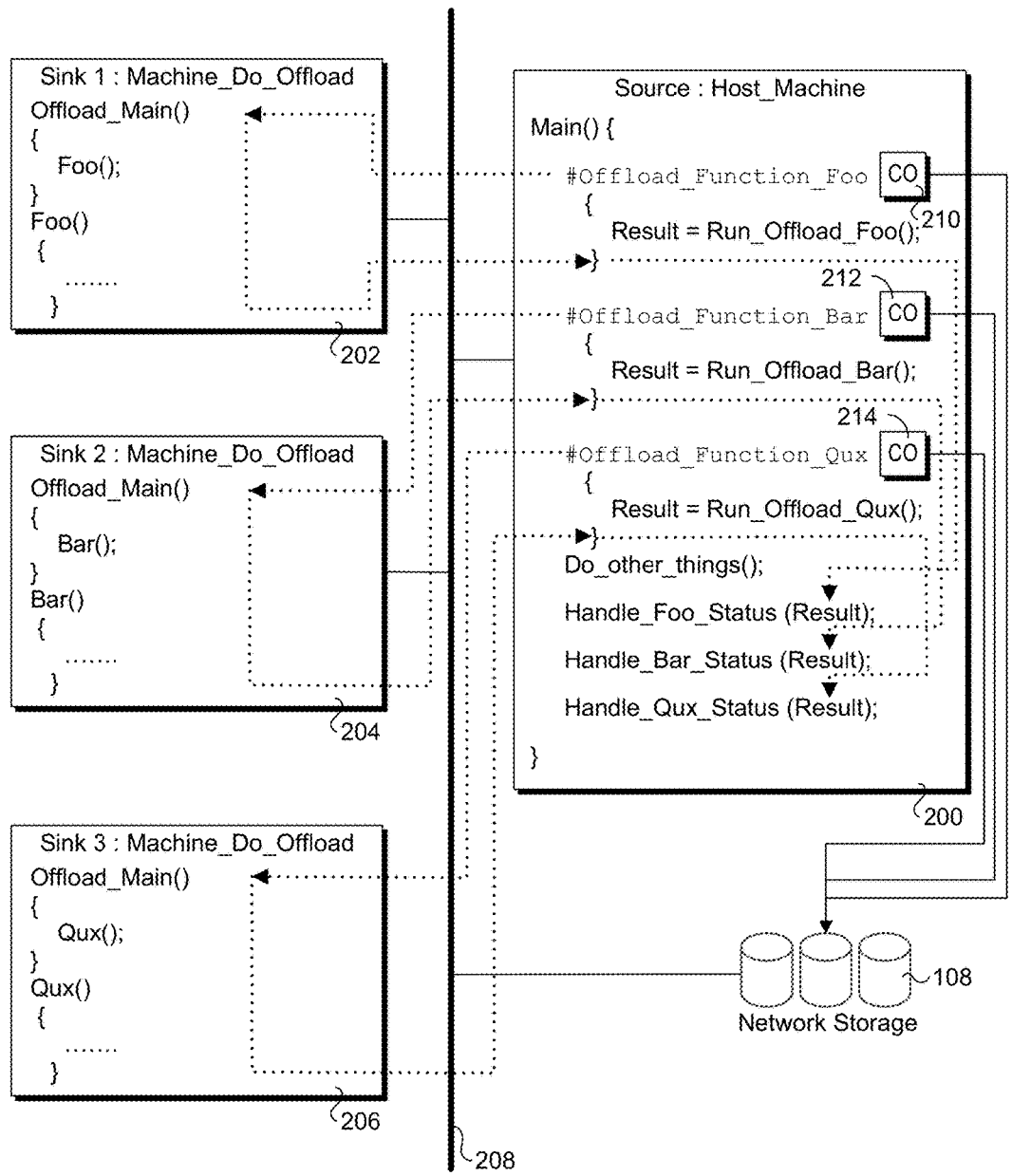
FIG. 2 is a schematic diagram illustrating a simple implementation of the offload programming model for processing a section of code corresponding to an executable job.

As an overview, a FIG. 2 depicts an illustration of a simple implementation of the offload programming model for processing a section of code corresponding to a given job. A processing entity comprising a host machine and operating as a "source" 200 is coupled in communication with three offload machines comprising "sinks" 202, 204, and 206 via an interconnect 208. In this example, the execution of the three functions Foo( ) Bar( ) and Qux( ) for job A of FIG. 1 is offloaded from source 200 to respective sinks 202, 204, and 206.

Figure 3:
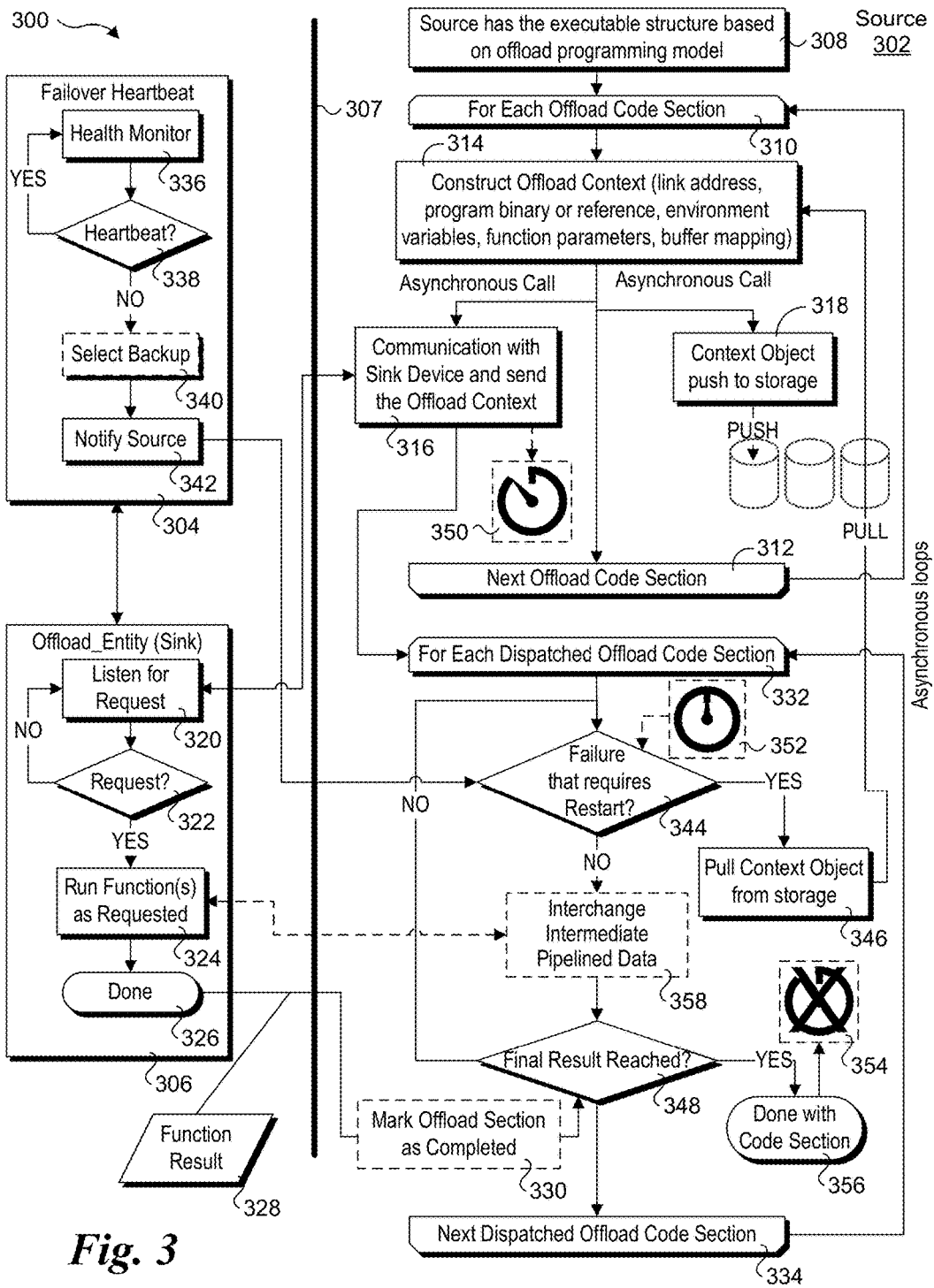
FIG. 3 is a combination flowchart and message flow diagram illustrating operations and logic performed by a source, and sink, and a failover heartbeat monitor.

With further reference to the flowchart and message flow diagram 300 of FIG. 3, an offload programming model checkpoint scheme, according to one embodiment, is implemented as follows. The entities illustrated in FIG. 3 include a source 302, a failover heartbeat monitor 304, and an offload entity comprising a sink 306. Although not shown, an actual implementation would include multiple sink entities. Generally, failover heartbeat monitor 304 may be implemented in a source or a separate entity (not shown) other than the source or any of the sinks.

The operations depicted for source 302 begin in a block 308, in which the source has the executable structure based on the offload programming model. A main loop is then depicted for each offload code section in the executable structure, as depicted by start and end loop block 310 and 312. The operations depicted in blocks 314, 316, and 318 are then performed on a loop-wise, ongoing basis for each offloaded code section.

First, in block 314, an offload context is constructed. Generally, the offload context should contain enough information for the offload to get restarted upon request. It should contain information such as sink identifications, program binary or library reference, buffer data, environment variables and/or function parameters relevant to the workload. In one embodiment, the offload context includes the link address (of the sink to execute the offload code), program code section binary or a reference to a previously distributed library that includes the one or more functions corresponding to the offloaded code section, environmental variables, function parameters, and buffer mapping information. Optionally, as described below, some aspects of buffer mapping may be configured in advance. Next, there is a pair of related operations that are performed asynchronously. In a block 316 the offload context generated in block 314 is sent to the applicable sink device, as depicted by sink 306. In conjunction, a context object corresponding to the offload context generated in block 314 is pushed to non-volatile storage in a block 318, such as depicted by network storage 108. Optionally, the context object can be pushed to onboard storage provide by the source platform. Under another option, context objects are written to onboard storage that is mirrored to network storage.

For simplicity, the offloaded code sections are depicted as being sent to sink 306. In an actual implementation, offloaded code sections would be sent to multiple sinks, with a given sink possibly receiving multiple offloaded code sections during execution of an overall job.

As depicted in a block 320 and a decision block 322 of sink 306, the sink device includes a listener that listens for requests from source 302. For example, such listeners are well-known in the art, and may include listening on a particular port used for communicating with source 302 or otherwise listening for communication from source 302 (e.g., detected using the source address for a communication originating from source 302). Once the offload context is received via the detected request, the function or function(s) defined in the offload context code is run (i.e., executed) by sink 306 until completion, as depicted by a block 324 and a completion block 326.

Upon completion of the code section, function result data 328 corresponding to the function result is returned to the source, as discussed above with reference to FIG. 2. In some embodiments, the data is returned by writing the data directly to a memory buffer identified by the offload context. In other embodiments, such when a sink is remote from the source, result data 328 is returned in a packetized manner and contains information by which a receiver of the packetized data can determine the buffer to write result data 328 to.

In an optional block 330, the offloaded code section is marked as completed by the source. In addition to explicitly marking a code section as complete, there are other techniques for determining what code sections have been completed, and which have not. For example, since the object context of each offloaded context identifies the sink that is to perform the function, when a subsequent request to the same sink is made, it implicitly indicates the prior request has been completed.

Also during an ongoing process, means are provided for detecting that a sink has failed to successfully execute a section of code that was offloaded to the sink. This includes operations and logic delineated by start and end loop blocks 332 and 334, which are performed on an ongoing basis for each offloaded code section that has been dispatched to a sink for execution until execution has been confirmed to be successfully completed or a failure is detected. As further indicated in FIG. 3, the loops defined by start and end loop blocks 310 and 312 and start and end loop blocks 332 and 334 are implemented asynchronously.

Under one embodiment, a failover heartbeat monitor 304 is configured to monitor the health of the sink entities in a cluster or otherwise failover heartbeat monitor 304 may be configured to monitor one or more groups of compute entities operating as sink entities. In one embodiment, health of the sink entities is determined using a well-known heartbeat technique, wherein the monitoring component or entity periodically "pings" the monitored entity with a heartbeat message, and the monitored entity (in this instance sink 306) returns a "alive" message or signal indicating it is operating properly.

In the illustrated embodiment of FIG. 3, this is implemented as follows. As depicted by the loop including a block 336 and a decision block 338, failover heartbeat monitor 304 periodically pings sink 306 with a heartbeat message. This loop continues until sink 306 fails to return an alive message or signal, which results in the answer to decision block 338 of NO. In an optional block 340, a backup (i.e., replacement) entity for sink 306 is selected. Optionally, this selection may be made by source 302. For example, in an opportunistic implementation wherein each code section is offloaded to an available sink that is dynamically selected by source 302, there may not be a need to select a backup in block 340.

In block 342, failover heartbeat monitor 304 notifies source 302 of the sink failure. If the failover heartbeat monitor is implemented an entity that is separate from source 302, a message is sent to source 302 over interconnect 307 identifying the failed sink (e.g., by using an address for the sink, as sink identifier (ID), or the like). Optionally, if a replacement sink is identified in block 340, the failure notification may be sent from the replacement sink. If failover heartbeat monitor 304 is implemented in source 302, then there is no need to send a failure notification message over an interconnect and the failure notification is forwarded internally within source 302.

A decision block 344 is used to determine whether a failure has occurred that requires a restart of the offloaded code section. Upon receiving a failure notification from failover heartbeat monitor 304, the answer to decision block 344 is YES, which initiates a sink recovery or failover process. As mentioned above, the failure notification identifies the failed sink (or otherwise the sink that failed to successfully complete execution of its offloaded code section). Thus, sink 302 can retrieve (i.e., "pull") the context object corresponding to the last offload context sent to the failed sink from storage 108, as depicted by a block 346, reconstruct the offload context and send it to the sink selected for replacement in block 340. Optionally, source 302 may determine which sink to send the reconstructed offload content to.

As depicted by a decision block 348 and the loop back to decision block 344, the failure detection operations are performed on an ongoing basis for a given offloaded code section until execution of the offloaded code section has been completed (or detection of a failure has occurred). As further depicted by the arrow passing from decision block 348 to end loop block 334, the operations and logic in the loop are performed for offloaded code sections that have been dispatched to multiple sinks in parallel.

Under an optional scheme, a timeout timer or the like may be used to detect the failure of a sink to complete execution of an offloaded code section. For example, there may be instances in which a sink is still operating properly (and thus will continue to provide an "alive" response to heartbeat messages), but an error occurs during execution of an offloaded code section, preventing execution of the code section from completing. By using a timeout timer, if an indication that the offloaded code section hasn't been returned to source 302 within the timeout period, there is a presumption that execution of the offloaded code section has failed. Generally, the timeout period for different code sections may vary, depending on the complexity of the code section and the processing capabilities of the sink that code section is offloaded to. For illustrative purposes, FIG. 3 includes a start timer icon 350, and expired timer icon 352, and a cleared or reset timer icon 354.

In one embodiment, the timeout timer implementation works as follows. In connection with dispatch of an offloaded code section in block 316 a timeout timer is started, using a time period within which the offloaded code section is projected to be completed by the sink it is offloaded to, preferably with some error margin added. The timeout timer will countdown until it is either cleared/reset or it expires. Returning to completion block 326, upon completion of the offloaded code section the result of decision block 348 will be YES, and the code section will be indicated as completed in a completion block 356. This will also clear/reset the countdown timer. However, if the countdown timer expires prior to detecting the offloaded code section has been completed, a notification will be provided to decision block 336, as depicted by expired timer icon 352. This will result in a YES answer, and the offloaded code section will be reconstructed and dispatched to another sink, as before. In one embodiment, each instance of a countdown timer includes indicia identifying the offload context it is associated with, such that the correct context object can be pulled from storage in block 346.

In some implementations, the processing of various functions is setup up in a pipelined manner. For example, the result from processing one function is used as input to another function. In addition, a function may be configured to generate a set of data in an iterative manner, e.g., via a processing loop or the like. The memory buffer information passed to the sink in the offload context may reference a FIFO (First-In, First-Out) buffer into which the data set is to be written, and as each data item in the set is generated via execution of the function it is written to an appropriate "slot" in the FIFO buffer. This is depicted by an optional block 358, in which intermediate pipelined data is interchanged with applicable sink entities.

Returning to FIG. 2 with further reference to FIG. 3, execution of the example main( ) executable code is implemented by host machine 200 in the following manner. Source 200 is responsible for managing execution of the job code that it receives from the job dispatcher. This includes execution of portions of the job's executable code on the source. As the job code is executed, the compute entity performing the execution (e.g., a processor, server, processor core, etc.) will encounter and/or detect an offload instruction or similar indicia indicating a following code section is to be offloaded. Depending on the particular implementation, the handling of the offload may be structured in a manner that specifies a specific sink to which the offloaded code section is to be sent for execution, the selection of a sink may be dynamically selected based on available sinks, or the combination of the two may be used.

As shown in FIG. 2, toward the beginning of the Main( ) code section is a #Offload_Function_Foo pragma, which representative of a compiler instruction that is generated to offload function Foo( ). For example, as described below, the developer of software to be executed using offloaded functions may use pragmas or the like in the source code to indicate to the compiler what portions of code are to be offloaded. In response to encountering and/or detecting the offload instruction, the applicable function code is offload by generating an offload context in block 314, with the offload context being sent to sink 202 and a corresponding context object (CO) 210 being generated and pushed to network storage 108 in block 318. Similar offload indicia is detected during subsequent execution of the Main( ) code, resulting in function Bar( ) being offloaded to sink 204 in conjunction with pushing a corresponding context object 212 to network storage 108, and function Qux( ) being offloaded to sink 206 in conjunction with pushing a corresponding context object 214 to network storage 108.

Each of sinks 202, 204, and 206 execute the code sections that are offloaded to them, resulting in parallel execution of the Main( ) code. Upon completion of execution of a function (or during execution of a function that generates a set of data to support pipelined execution), the function result data is returned to the source by writing the result data to an applicable memory buffer that may be identified via buffer mapping data included in the offload context or otherwise setup in advance. For example, the buffer mapping data may identify the address of the beginning of a buffer to which the result data is to be written. This is performed in a similar manner for each of offloaded functions Foo( ) Bar( ) and Qux( ), with result data being written to applicable buffers that are accessible to source 200.

The effect of this offload scheme writing result data into the buffers is that the Main( ) code can be continued to be executed by a source and the results data generated by the sinks in a similar manner as if the source had executed the offloaded code itself. Another inherent feature is that this can be implemented in a manner that has very high reliability, since sink failures are immediately detected and the object context including the offload code that has been sent to a failed sink is (substantially) immediately regenerated and sent to another sink for execution.

If necessary, following or upon detection of a sink failure, a "quiesce" request may be issued from the source to one or more other sinks to resynchronize the parallel execution process in consideration of the execution time lost due to the sink failure. However, this generally will be unnecessary if the execution time for the offloaded code section is small and/or in view that the source is sending out the offloaded contexts, and thus the resynchronization can be achieved by simply waiting for completion of the offloaded code section sent to the replacement entity before proceeding.

In addition, in some embodiments employing pipelined data structures the data structures can be marked such that an accessing code section can detect whether the data is valid. For example, suppose a sink that is writing data to a first buffer that is accessed by another offloaded code section (or even a code section that is executed by a source) fails. The buffer may be marked such that if the other offloaded code section attempts to access stale data, it will wait until updated data is written to the buffer by the replacement sink.

Exemplary Topologies for Offload Domains

As discussed above, aspects of the embodiments disclosed herein may be implemented using various system configuration, including configurations employing one or more hierarchy levels. Generally, the lowest level of the hierarchy will include a group of compute entities or entities that are implemented as sinks. Such groups are commonly referred to as a cluster, although the usage of the term cluster shall not be limiting; rather, a cluster, as used herein, may generally represent an aggregation of compute entities or entities. In one aspect, sink entities within a managed cluster are grouped into different virtual or logical domains based on chosen criteria such as capacity, geographic location, or specific capabilities. Each entity within the same domain is able to carry out the same task, be it a computation task, IO storage, web front end, or something else. Domain formation can be recursive; that is, a domain can exist within another domain.

The various entities in an implementation are interconnected using various physical interconnect structures, as described above. In addition, there are three virtual (conceptual) interconnects within this architecture: (a) communications inside the domain (between sink entities); (b) communications between source and sinks; and (c) communications between sources. (a) and (b) are required. (c) is optional but in some implementations, it is expected to be something like an MPI (message passing interface) job dispatching network. There is no requirement for the three interconnects to be disjointed and/or connected.

Figure 4:
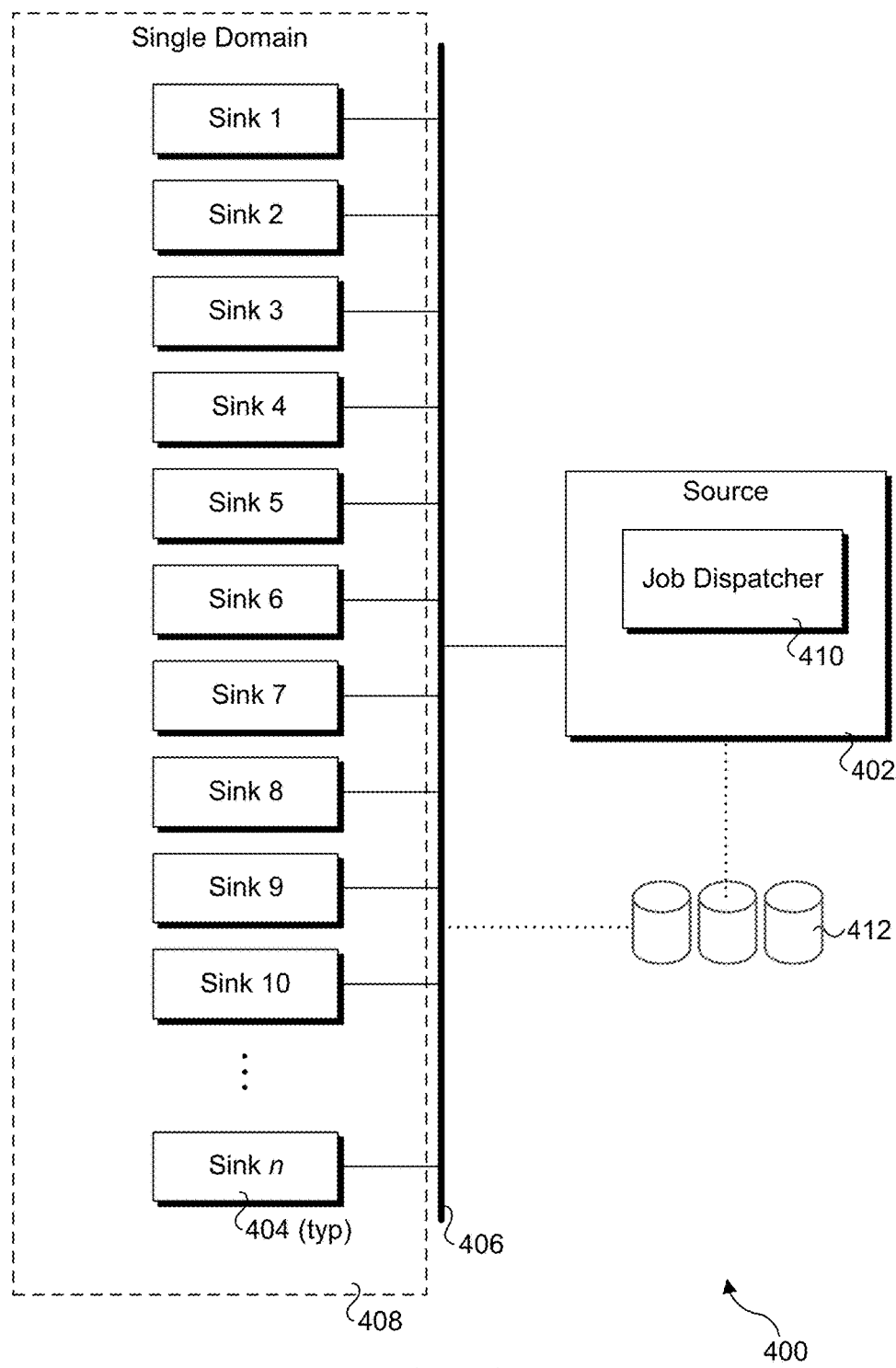
FIG. 4 is a schematic diagram illustrating a first example of an offload domain topology including a source that is connected to multiple sinks implemented in a single domain.

FIG. 4 depicts a first example of an offload domain topology 400 including a source 402 that is connected to n sinks 404 via an interconnect 406. The sinks 404 are associated with a single domain 408. Also, under this configuration, the functions for a job dispatcher 410 are implemented on the same machine used for source 412. Depending on the types of entities used for sinks 404, source 402 may be connected to storage 412 via interconnect 406 or via another interconnect, as depicted by the dotted lines between storage 412 and each of source 402 and interconnect 406. For example, under the configuration described below with reference to FIG. 8, interconnect 406 comprises a PCIe interconnect structure and source 402 is connected to storage 412 via a network adaptor.

Figure 5:
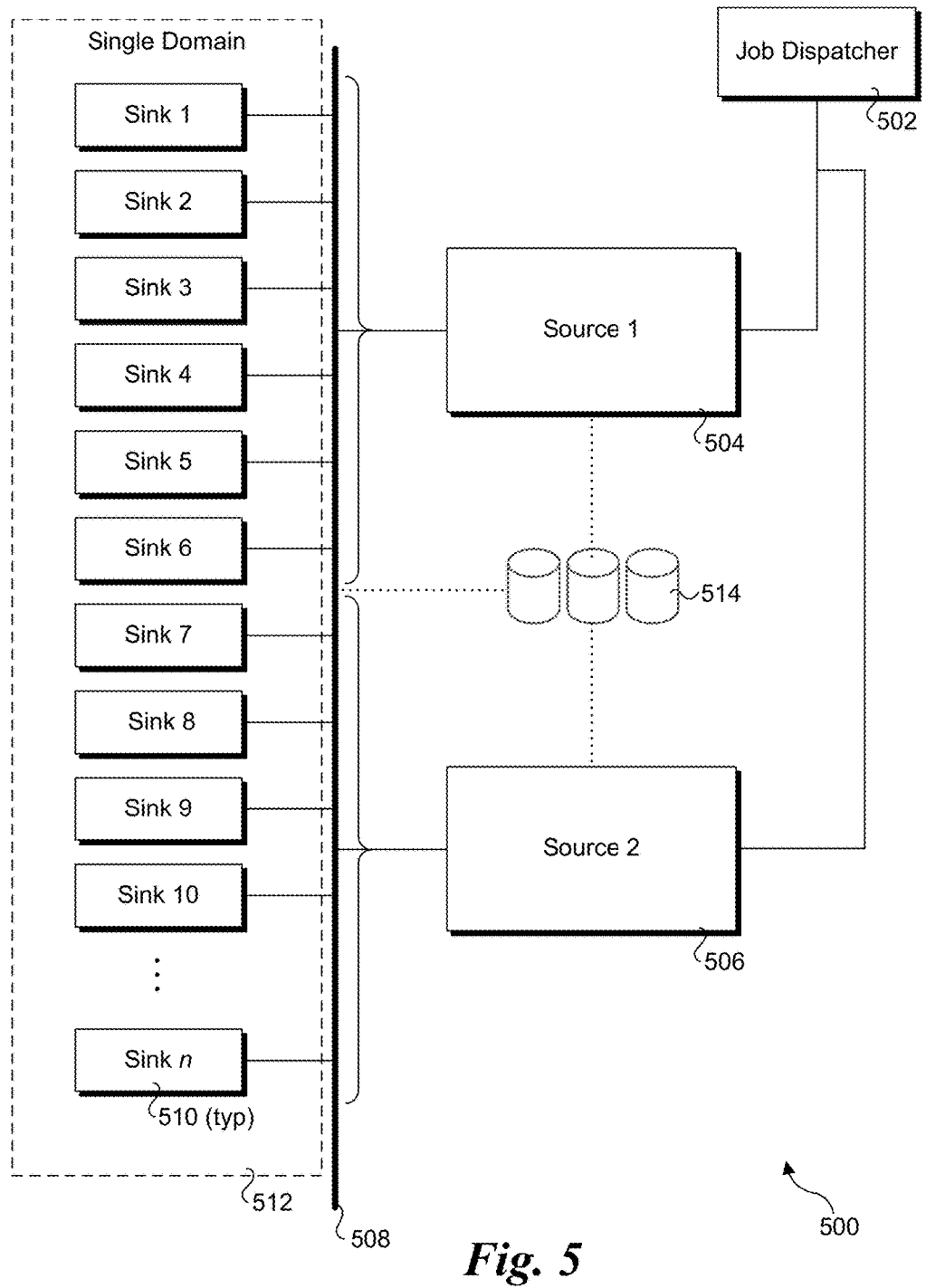
FIG. 5 is a schematic diagram illustrating a second example of an offload domain topology including a job dispatcher connected to a pair of sources, which in turn are connected to multiple sinks implemented in a single domain.

FIG. 5 depicts a second example of an offload domain topology 500 including a job dispatcher 502 connected to a pair of sources 504 and 506. Each of sources 504 and 506 are connected to an interconnect 508 to which n sinks 510 in a single domain 512 are also connected. Sources 504 and 506 are also enabled to access storage 514 either via interconnect 508 or another interconnect. As further illustrated, source 504 is used to offload codes sections for a first group of sinks 510 in domain 512, while source 506 is used to offload code sections to a second group of sinks 510. Each of sources 504 and 506 are connected to storage 514, either via interconnect 508, or via another interconnect.

Figure 6:
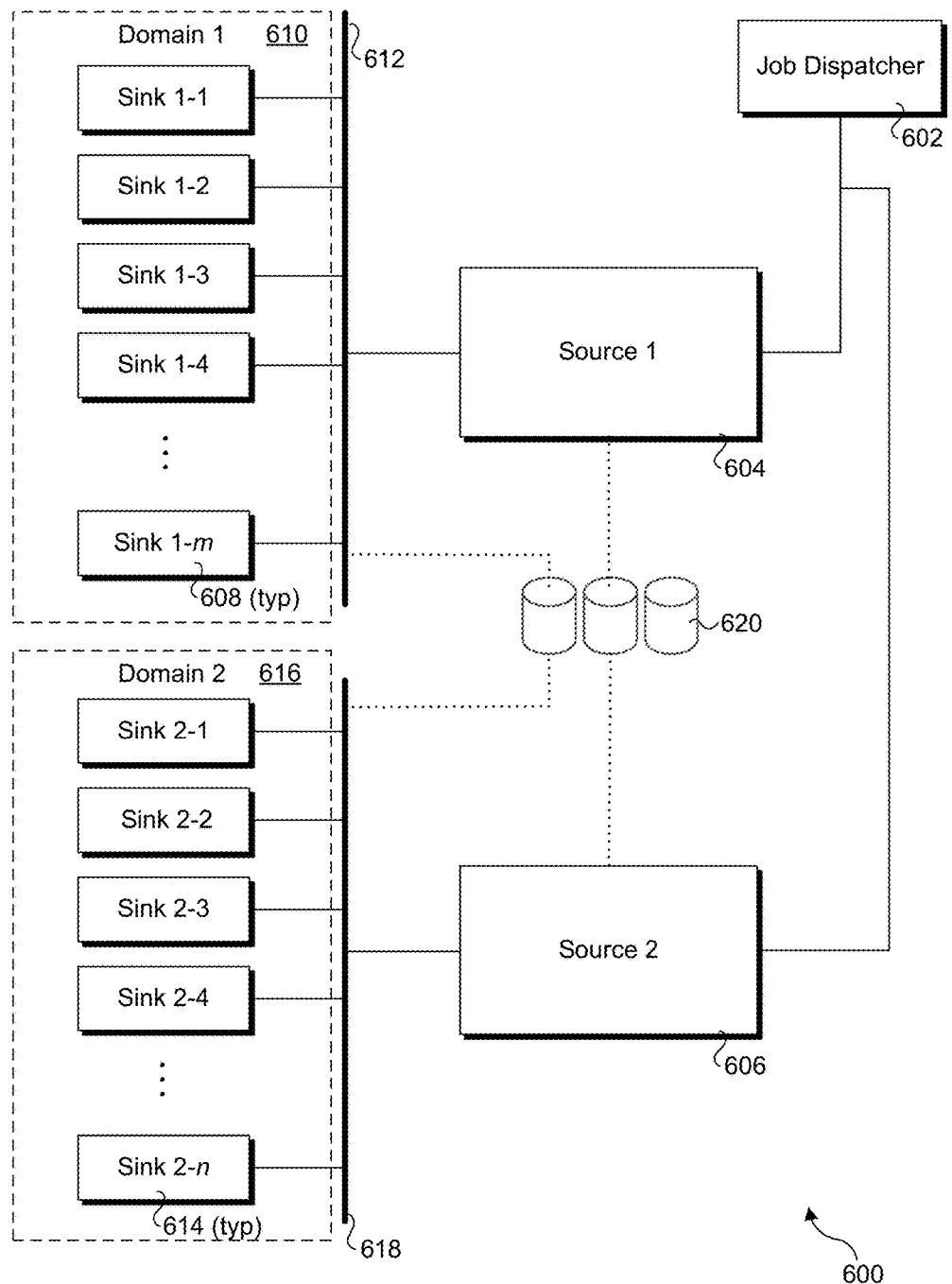
FIG. 6 is a schematic diagram illustrating a third example of an offload domain topology including a job dispatcher connected to a pair of sources, which in turn are connected to multiple sinks implemented in first and second domains.

FIG. 6 depicts a third example of an offload domain topology 600 including a job dispatcher 602 connected to a pair of sources 604 and 606. Source 604 offloads codes sections to m sinks 608 in a first domain 610, with data being transferred over an interconnect segment 612. Source 606 offloads codes sections to n sinks 614 in a second domain 616, with data being transferred over an interconnect segment 618. Generally, interconnect segments 612 and 618 may comprise separate interconnect structures, or may be part of the same interconnect structure (e.g., both may be interconnects segments in the same local area network (LAN). Each of sources 604 and 606 are connected to storage 620, either via interconnect segments 612 and 618, or via other interconnects.

Figure 7:
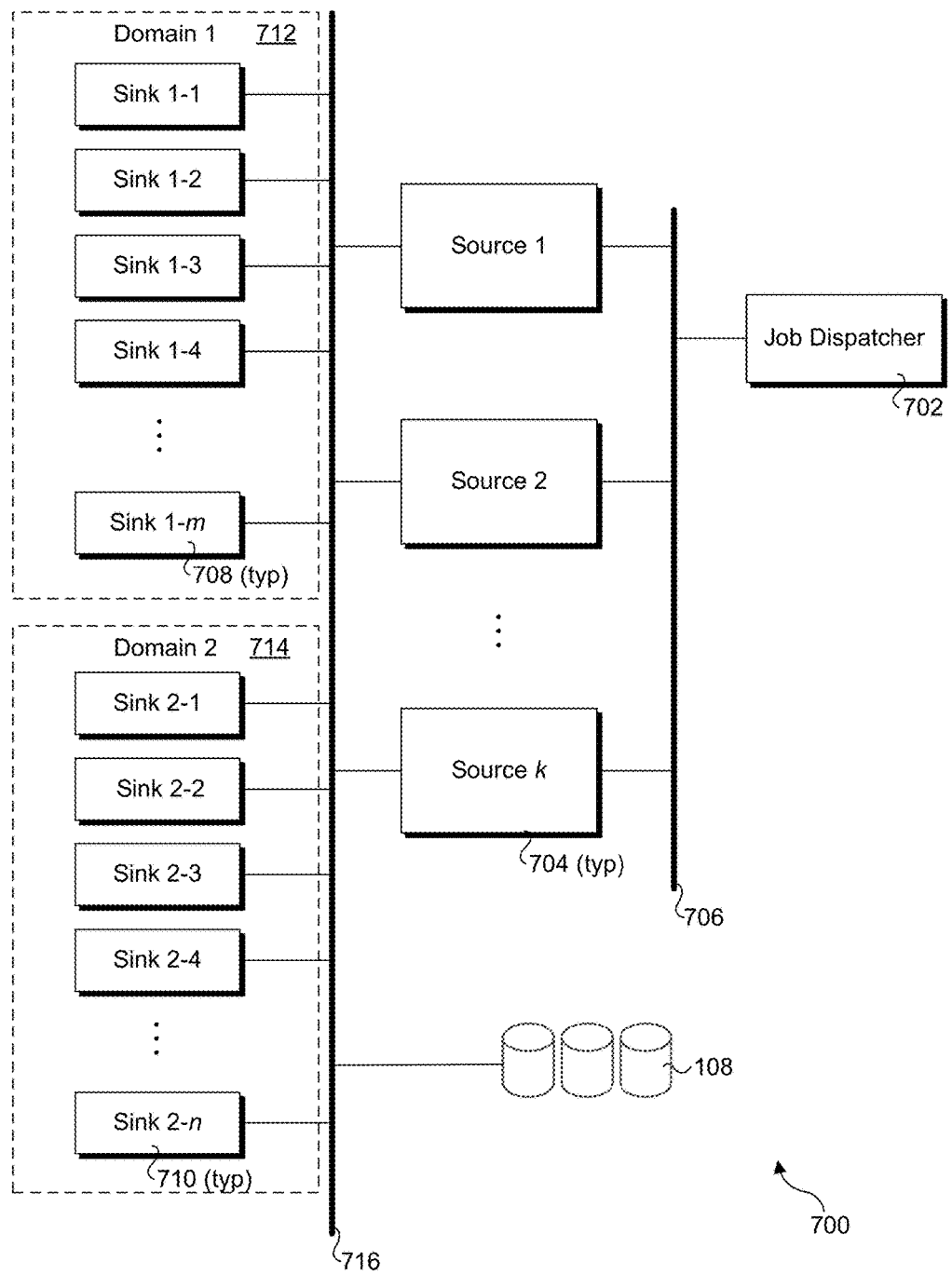
FIG. 7 is a schematic diagram illustrating a fourth example of an offload domain topology including a job dispatcher connected to multiple sources via a job dispatch fabric, and wherein the sources are connected to sinks in first and second domains via an offload fabric.

In addition to point-to-point connections between system entities, bus-like "fabric" interconnect structures may also be implemented, such as depicted by an offload domain topology 700 in FIG. 7. Under this configuration, a job dispatcher 702 is connected to k sources 704 via a job dispatch fabric 706. At the next level in the hierarchy, sources 704 are connected to m sinks 708 and n sinks 710 in domains 712 and 714 via an offload fabric 716. Storage 718 is also depicted as being connected to offload fabric 716; optionally, one or more of sources 704 may be connected to storage 718 via a separate interconnect that is not shown.

Figure 8:
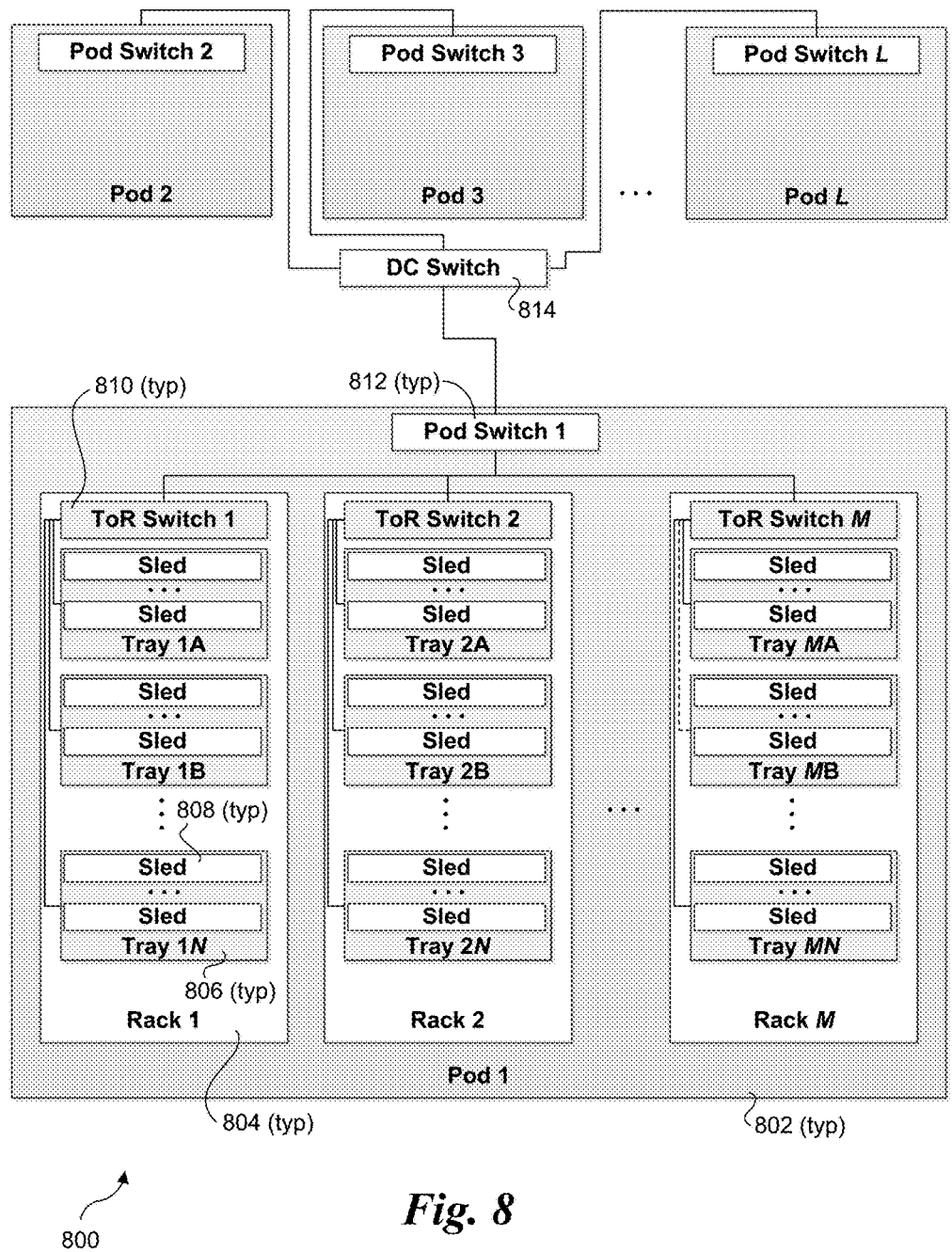
FIG. 8 is a schematic block diagram illustrating a data center physical hierarchy including pods, racks, trays, and sleds'

Generally, HPC operations in accordance with the embodiments herein may be implemented using various system architectures, including architectures used in data centers. Data centers commonly employ a physical hierarchy of compute, network and storage shared resources to support scale out of workload requirements. FIG. 8 shows a portion of an exemplary physical hierarchy in a data center 800 including a number L of pods 802, a number M of racks 804, each of which includes slots for a number N of trays 806. Each tray 806, in turn, may include multiple sleds 808. For convenience of explanation, each of pods 802, racks 804, and trays 806 is labeled with a corresponding identifier, such as Pod 1, Rack 2, Tray 1B, etc.

Depicted at the top of each rack 804 is a respective top of rack (TOR) switch 810, which is also labeled by TOR Switch number. Generally, TOR switches 810 are representative of both TOR switches and any other switching facilities that support switching between racks 804. It is conventional practice to refer to these switches as TOR switches whether or not they are physically located at the top of a rack (although they generally are).

Each Pod 802 further includes a pod switch 812 to which the pod's TOR switches 810 are coupled. In turn, pod switches 812 are coupled to a data center (DC) switch 814. The data center switches may sit at the top of the data center switch hierarchy, or there may be one or more additional levels that are not shown. For ease of explanation, the hierarchies described herein are physical hierarchies that use physical LANs. In practice, it is common to deploy virtual LANs using underlying physical LAN switching facilities.

In some embodiments, it is advantageous to deploy an offload hierarchy that matches or substantially matches the physical hierarchy of the implementation environment. Also, different checkpoint schemes may be employed for different levels in the hierarchy. Generally, the sinks will occupy the lowest level of the offload hierarchy. In accordance with physical hierarchy employed by data center 800, the sinks will correspond to compute entities or entities in sleds 808. It is noted that trays and sled may also be referred to by different names, and/or different physical components may be used within racks, such as blade server chassis that contain multiple server blades.

Under one data center implementation scheme, server blades or server modules are implement for sources and sinks. For example, a sled may include multiple server blades or server modules, each of which has a separate interconnect interface and is logically operated as a separate compute entity. Generally, each of these compute entity will be implemented as a separate server and function is a similar manner to a stand-alone physical server, but in a much smaller physical package. A server blade or module may also be configured as multiple micro-servers. In this instance, the micro-servers may be used for the sinks.

Many integrated Core (MIC) device implementations

Recently, Intel® introduced its line of Xeon Phi™ Co-processors, which include a processor with many integrated cores implemented on a PCIe card. This class of device is referred to herein as a many integrated core device, or simply a MIC. In one embodiment, a MIC includes approximately 60 cores, with future generation Xeon Phi™ Co-processors projected to include upwards of 100 cores and beyond.

The MIC architecture enables a single server platform to support a large number of compute processing cores, particularly when multiple MICs are installed in the same platform. This is highly advantageous for HPC environments, particularly where the processing tasks involve a high-degree of locality and parallelism. Generally, the interconnects with the least latency are those in processor and/or SoC devices, since they combine very-high bandwidth and very short lengths. As a result, communication between compute cores in a MIC involves very low latencies, which is ideal for HPC.

Figure 9:
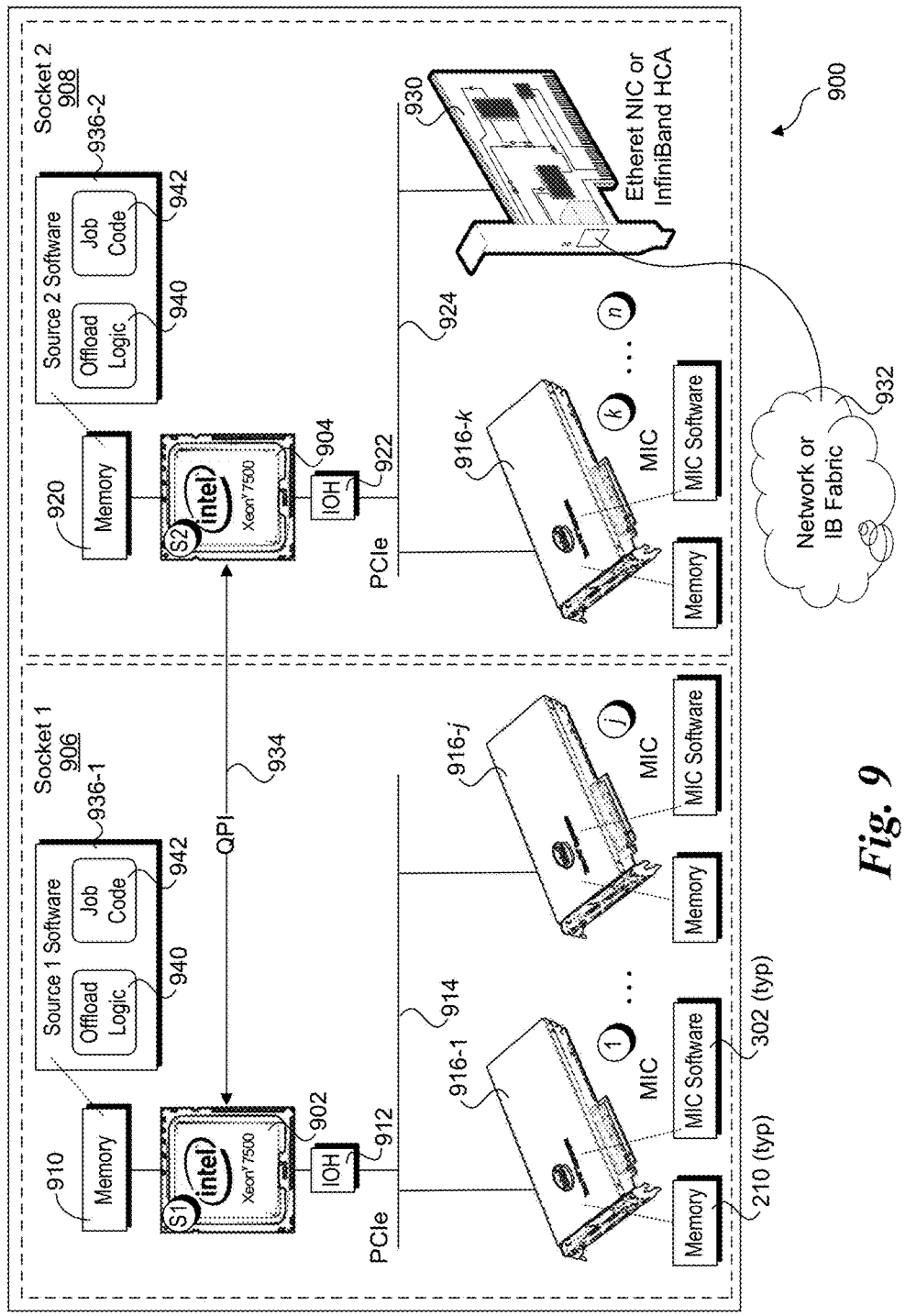
FIG. 9 is a schematic diagram of a dual-socket server platform in which multiple MICs are implemented, and including a first host processor that is implemented as a first source and a second host processor that is configured to operate as a second source.

In one embodiment, the sinks are implemented using processor cores MICs. FIG. 9 shows a dual-socket server platform 900 in which multiple MICs are implemented. The server includes two Intel® Xeon® processors (aka CPUs) 902 and 904, each associated with a separate "socket," depicted as a socket 906 and a socket 908. Each socket includes a set of components that are collectively operated as a separate server subsystem of dual-socket server platform 900. For socket 906, the illustrated components include host memory 910, an input-output hub (IOH) 912, a PCIe interconnect 914, and j PCIe MICs 916-1 . . . 916-j. Similarly, for socket 908, the illustrated components include host memory 920, an input-output hub (IOH), a PCIe interconnect 924, and n-j PCIe MICs 916-k . . . 916-n and a network adaptor 930 comprising an Ethernet NIC (Network Interface Controller) or an InfiniBand (IB) Host Controller Adapter (HCA) coupled to a network or IB fabric 932. As further shown in FIG. 9, processors 902 and 904 are connected via a QuickPath Interconnect® (QPI) link 934 comprising a socket-to-socket interconnect.

It is noted that the architecture shown in FIG. 9 and other Figures herein are exemplary, and specific components are merely representative of a type of more general component that may be implemented for a particular function, set of functions, or implementation. For example, the Xeon® processors are and IOH are represented of a generic CPU and IO subsystem.

Under server platform 900, the server's software is configured such that each of sockets 906 and 908 host a respective source, as depicted by source software 936-1 and 936-2. Under this configuration, the sinks for source 1 comprise the processor cores on MICs 916-1 . . . 916-j, while the sinks for source 2 comprise the processor cores on MICs 916-k . . . 916-n. In one embodiment, the sinks implemented via the processor cores in the MICs installed in the PCIe slots of socket 1 are implemented as sinks in a first domain, while the sinks implemented via the processor cores in the MICs in the PCIe slots of socket 2 are implemented as sinks in a second domain, such as shown in FIG. 6 and discussed above. In another embodiment, the host processors in sockets 1 and 2 are implemented as respective sources 1 and 2, while the processor cores in the MICs in the PCIe slots both sockets are implemented as sinks in a single domain, such as shown in FIG. 5 and discussed above.

For simplicity, each of source software 936-1 and 936-2 is depicted as including offload logic 940 and job code 942; in addition to these software components, each source would include additional software, such as an operating system and applications. Offload logic 940 includes logic for implementing the operations and logic of the source 302 flowchart portion of FIG. 3, as well as various communication functions. If the failover heartbeat monitor is implemented by the source, the software for implementing these functions is further included in source software 936-1 and 936-2.

In an optional configuration, only one of the host processors is implemented as a source. Under this configuration, the host processor that is not implemented as a source may be used for other purposes, such as monitoring the health of the MICs and offloading some of the tasks performed by the source. In one embodiment, the host processor that is not implemented as a source is used to host a job dispatcher.

Figure 10:
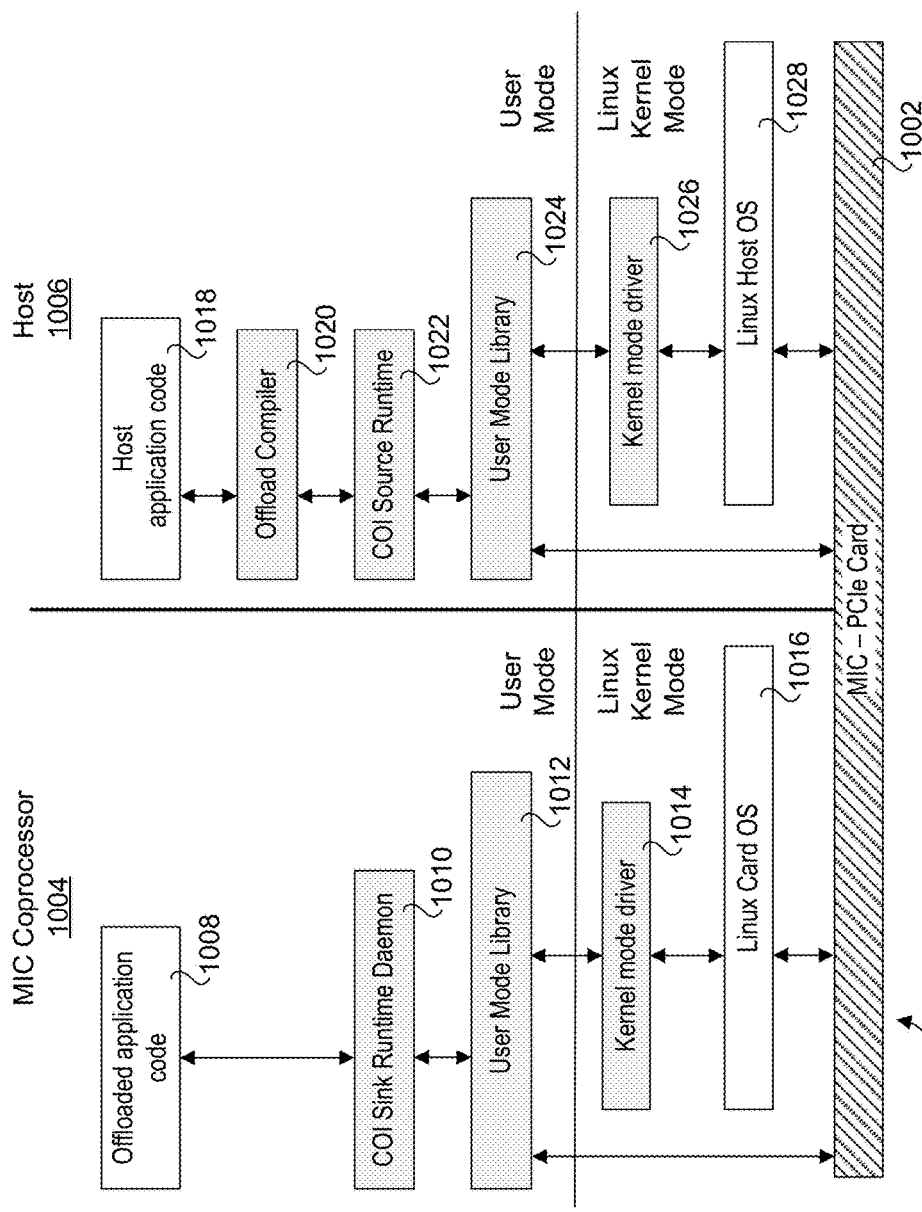
FIG. 10 is a schematic block diagram illustrating a software architecture including software components implemented on a MIC coprocessor PCIe card including MIC Coprocessor software and a host software according to one embodiment employing an Intel® Xeon Phi™ MIC coprocessor.

FIG. 10 shows a software architecture 1000 including software components implemented on a MIC coprocessor PCIe card 1002 including MIC Coprocessor software 1004 and a host software 1006 according to one embodiment employing an Intel® Xeon Phi™ MIC coprocessor. There are essentially four layers in the software stack: offload tool runtimes, user-level offload libraries, a low-level communication layer that's split between user-level libraries and kernel drivers, and the operating system. There is a host-side and co-processor-side component for each. Everything below the offload runtimes is part of the Intel® Manycore Platform Software Stack (MPSS).

In FIG. 10, the offload tool runtime components, user-level offload libraries and low-level communication layer components are shaded in light gray. Generally, many of the software components for MIC coprocessor software 1004 and host software 1006 at the user mode level are complementary and support a Coprocessor Offload Infrastructure (COI). The MIC coprocessor software 1004 components include offloaded application code 1008, a COI sink runtime daemon 1010, a user mode library 1012, a kernel mode driver 1014, and a Linux card operating system (OS) 1016. The host software 1006 components include host application code 1018, an offload compiler 1020, a COI source runtime module 1022, a user mode library 1024, a kernel mode driver 1026 and a Linux host OS 1028.

The COI libraries provides services to create coprocessor-side processes, create FIFO pipelines between the host and coprocessor, move code and data, invoke code (functions) on the coprocessor, manage memory buffers that span the host and coprocessor, enumerate available resources, etc. Offload runtime implementations aren't strictly required to use COI, but doing so can relieve developers of significant implementation and tuning effort and complexity, and it provides portability to other host OSes such as Microsoft® Windows™.

Under one approach, offloading code sections is facilitated through the use of offload indicia added to the source code to instruct the compiler to include instructions or the like in the binary code generated by the compiler to instruct the host processor (operating as a source) to offload particular sections of code. The offload indicia include:

language pragmas, e.g., #pragma omp target data device (1) map ( ) used by various compilers, e.g., from Intel® and CAPS (Compiler and Architecture for Embedded and Superscalar Processors project, and #pragma offload, an Intel-specific extension;

language keywords, e.g. the Shared keyword used by the Intel® compiler or with language constructs used by CUDA (Compute Unified Device Architecture) or OpenCL such as Intel® SDK for OpenCL Applications XE for the coprocessor; and library calls, e.g. Intel® Math Kernel Library (MKL), MAGMA (Matrix Algebra on GPU and Multicore Architectures) or NAG (Numerical Algorithms Group) calls that divide work across the host and coprocessor.

In general, the offload pragmas rely on the programmer to explicitly specify what to do. But in some cases, there is a default, for ease of programming. In one embodiment, data transfer of variables to and from the coprocessor for offloaded code is explicitly named with map(to: . . . ), map(from: . . . ) and map(tofrom: . . . ) clauses, but the map(tofrom: . . . ) clause is implicitly used for all variables that are visible in the scope of a construct during compilation. The coprocessor offload target is explicitly specified, e.g. device (1). It's the programmer's responsibility to explicitly synchronize data between coprocessors as needed.

Under terminology used for the Intel® Xeon Phi™ MIC coprocessor, each MIC device is referred to as an "engine," and during an initialization phase the device capabilities of the MICs are enumerated, including identification of the available engines. For example, FIG. 11 shows a pseudo code listing used to get the number of engines and get a handle to a first engine. Similar handles are obtained for other engines, and the MICs are configured to be implemented as COI engines.

A COI process is used to facilitate offloading of code sections to the COI engines. The COI process abstracts the remote process executing on a sink. APIs are provided to start and stop remote processes, as well as load dynamic libraries. The COI process is also used to lookup functions in remote processes so they can be invoked.

FIGS. 12a and 12b respectively show exemplary source-side and sink-side pseudo code listings for offloading a function using a COI process. As shown in FIG. 12a, first a COI process is created, which identifies the engine, the executable file, the argc/argv environmental variables, proxy I/O setup and space for buffers. Next, a handle to a function is obtained. The last section of code corresponds to determining a reason a COI process is shutdown. As shown in the sink-side code of FIG. 12b, the sink executes a main process that includes a set up run functions that are executed in a pipelined manner.

In conjunction with enumerating the MIC device capabilities and obtaining handles to engines that are to be implemented as COI engines, COI buffers are setup. The COI buffers are used to manage data on the MIC device. The buffers are passed to run functions, but can also be written/read directly using other APIs. The COI runtime manages the location of buffer memory. It ensures that buffer is present where needed, e.g., prior to a run function executing. It also manages physical buffer space on the MIC device by paging buffers back and forth between the host and the MIC device.

FIGS. 13a and 13b respectively show exemplary source-side and sink-side pseudo code listings for setting up and using a buffer. On the source-side, setting up a buffer involves creating the buffer and then mapping the buffer The buffer may then be written to directly by the source (e.g., the "Hello world!\n" example), or call a run function to be executed by a sink, which will write the result to the identified buffer. The sink-side pseudo code listing in FIG. 13b shows a simple example of "printing" data in a buffer, which results in the data being written to the identified buffer.

RDMA Implementations

Remote Direct Memory Access (RDMA) provides a mechanism that enables remote devices to write directly to memory on another device. In the context the data center architecture of FIG. 8, RDMA could be implemented between server entities with network-enabled hosts. The most-common RDMA deployments are implemented using InfiniBand HCAs, since several InfiniBand vendors provide InfiniBand HCAs with RDMA facilities having standardized functionality defined in applicable InfiniBand standards. Optionally, there are RDMA implementations over other network interconnect structures, such as RDMA over Converged Ethernet (RoCE), which similarly supports standardized functionality that is defined in the RoCE specification.

One of the criteria for supporting offloaded code section in accordance with the embodiments herein is the ability for sinks to write data into buffers that are accessible to the host processor used by a source. Both RDMA over InfiniBand and RoCE support this capability, enabling compute entities implemented for sinks, such as server blades and server modules in a first sled or chassis, to directly write to memory used by a host in another sled or chassis.

Further aspects of the subject matter described herein are set out in the following numbered clauses:

1. A method implemented in a computing environment including a compute entity comprising a source commutatively coupled to a plurality of compute entities comprising sinks, the method comprising:
   managing execution of a job comprising executable code using the source;
   offloading sections of the executable code to the plurality of sinks;
   storing, for each section of code that is offloaded to a sink, offload context information identifying the section of code that is offloaded and the sink it is offloaded to;
   receiving, for offloaded sections of code, results generated by the sinks to which the sections of code were offloaded;
   detecting that a sink has failed to successfully execute a section of code that was offloaded to the sink, and in response thereto,
   retrieving the offload context information corresponding to the section of code offloaded to the sink; and
   offloading the section of code to another sink for execution.

2. The method of clause 1, further comprising:
   employing the source to execute the job;
   detecting, during execution of the job, a first code section including a one or more first functions to be offloaded to a sink;
   constructing a first offload context including an address of a first sink, one of the first code section or indicia identifying the one or more first functions, and one or more function parameters for the one or more first functions;
   sending the first offload context to the first sink;
   storing a first offload context object corresponding to the first offload context in non-volatile storage;
   receiving a first function execution result data produced by the first sink upon execution of the one or more first functions by the first sink; and
   continuing execution of the job by the source as if the source executed the one or more first functions.

3. The method of clause 2, further comprising:
   detecting, during execution of the job, a second code section including a one or more second functions to be offloaded to a sink;
   constructing a second offload context including an address of a second sink, one of the second code section or indicia identifying the one or more section functions, and one or more function parameters for the one or more second functions;
   sending the second offload context to the second sink;
   storing a second offload context object corresponding to the second offload context in non-volatile storage;
   one of receiving information identifying the second sink has failed, detecting the second sink has failed, or detecting the second sink has failed to complete execution of the second code section, and in response thereto,
   retrieving the second offload context object from non-volatile storage;
   employing the second offload context object to construct a third offload context including an address of a third sink, the second code section or indicia identifying the second code section, and the one or more function parameters for the one or more second functions;
   sending the third offload context to the third sink;
   storing a third offload context object corresponding to the third offload context in non-volatile storage;
   receiving a second function execution result data produced by the third sink upon execution of the one or more second functions by the third sink; and
   continuing execution of the job by the source as if the source executed the one or more second functions.

4. The method of clause 2 or 3, wherein the first offload context includes information identifying a memory buffer to which the first function result is to be written, and wherein the sink writes the first function result to the memory buffer.

5. The method of clause 4, further comprising:
   setting up a Remote Direct Memory Access (RDMA) mechanism between the source and the first sink; and
   employing an RDMA write to write the first function result directly to the memory buffer.

6. The method of any of clauses 2-5, further comprising:
   distributing a library containing the one or more first functions to the first sink or a host device in which the first sink is implemented in advance of executing the job; and
   including indicia in the first offload context identifying what library functions to execute.

7. The method of any of the proceeding clauses, wherein detecting that a sink has failed to successfully execute a section of code that was offloaded to the sink is detected by using a heartbeat monitoring scheme to determine a sink has failed.

8. The method of any of the proceeding clauses, wherein detecting that a sink has failed to successfully execute a section of code that was offloaded to the sink is detected by using a timeout timer.

9. The method of any of the proceeding clauses, wherein the source comprises a host processor in a server platform and at least a portion of the sinks comprise processor cores in a many integrated core (MIC) device installed in server platform.

10. The method of any of the proceeding clauses, wherein the source comprises a server platform in which multiple many integrated core (MIC) devices are installed, and the sinks comprise processor cores in the multiple MIC devices.

11. The method of any of the proceeding clauses, wherein the source dispatches offloaded code sections to the plurality of sinks that are operating in a single domain.

12. The method of any of the proceeding clauses, further comprising operating the sinks in a single domain under which sinks associated with the single domain receive and execute sections of executable code offloaded by the source.

13. At least one tangible non-transitory machine-readable medium having instructions stored thereon configured to be executed by the plurality of compute entities to implement the method of any of the proceeding clauses.

14. A server platform comprising:
a host processor coupled to host memory;
a plurality of expansion slots, communicatively-coupled to the host processor;
one or more many integrated core (MIC) devices installed in respective expansion slots, each MIC device including a plurality of processor cores and on-board memory; and
a network adaptor, installed in either an expansion slot or implemented as a component that is communicatively-coupled to the host processor;
wherein the server platform further includes software instructions configured to be executed on the host processor and a plurality of the processor cores in the MIC device to enable the server platform to:
configure the host processor as a source and at least a portion of the plurality of processor cores in the MIC device as sinks;
configure memory mappings between the on-board MIC memory and the host memory;
manage execution of a job comprising executable code on the host processor;
offload sections of the executable code to the plurality of sinks;
transmit for storage on a non-volatile storage device assessable via a network coupled to the network adaptor, for each section of code that is offloaded to a sink, offload context information identifying the section of code that is offloaded and the sink it is offloaded to;
execute the offloaded code section on the sinks to generate result data;
store the result data in memory buffers accessible to the host processor;
detect that a sink has failed to successfully execute a section of code that was offloaded to the sink, and in response thereto,
retrieve the offload context information corresponding to the section of code offloaded to the sink that was previously stored; and
offload the section of code to another sink for execution.

15. The server platform of clause 14, wherein execution of the instructions further enables the server platform to:
execute a first portion of the job via the source;
detect, during execution of the job, a first code section to be offloaded including one or more first functions;
identify a first sink to offload the first code section to;
construct a first offload context including an address of the first sink, one of the first code section or indicia identifying the one or more first functions, one or more function parameters for the one or more first functions, and information mapping a memory buffer to which result data generated via execution of the one or more first functions is to be written;
transfer the first offload context to the first sink;
store a first offload context object corresponding to the first offload context in non-volatile storage;
execute, via the first sink; the one or more first functions using the one or more function parameters to generate result data;
write the result data to the memory buffer; and
continue execution of the job by the source as if the source executed the first function.

16. The server platform of clause 15, wherein execution of the instructions further enables the server platform:
detect, during execution of the job, a second code section to be offloaded including a one or more second functions;
identify a second sink to offload the second code section to;
construct a second offload context including an address of the second sink, one of the second code section or indicia identifying the one or more second functions, one or more function parameters for the one or more second functions, and information mapping a memory buffer to which result data generated via execution of the one or more second functions is to be written;
send the second offload context to the second sink;
store a second offload context object corresponding to the second offload context in non-volatile storage;
detecting the second sink has failed, or detecting the second sink has failed to complete execution of the second code section, and in response thereto
one of receive information identifying the second sink has failed, detect the second sink has failed or detect execution of the second code section on the second sink has resulted in an error, and in response thereto,
retrieve the second offload context object from non-volatile storage;
employ the second offload context object to construct a third offload context including an address of a third sink, one of the second code section or indicia identifying the one or more second functions, one or more function parameters for the one or more second functions, and information mapping a memory buffer to which result data generated via execution of the one or more second functions is to be written;
sending the third offload context to the third sink;
storing a third offload context object corresponding to the third offload context in non-volatile storage;
execute, via the first third sink; the one or more section functions using the one or more function parameters to generate result data;
write the result data to the memory buffer; and
continue execution of the job by the source as if the source executed the one or more second functions.

17. The system of clause 16, wherein the system is further configured to implement a heartbeat monitor scheme to detect failure of a sink.

18. The system of clause 16 or 17, wherein the system is further configured to implement a timeout timer to detect execution of the second code section on the second sink has resulted in an error.

19. The server platform of any of clauses 14-18, wherein the server platform comprises a dual-socket server including first and second sockets, wherein each socket includes a respective host processor coupled to respective host memory and at least one expansion slot communicatively-coupled to the host processor, and wherein the host processor and host memory of clause 12 comprises a first host processor and first host memory in the first socket.

20. The server platform of clause 19, wherein each of the first and second sockets include one or more expansion slots in which a respective MIC device is installed, and wherein the sinks in the processor cores of the MIC devices installed in the expansion slots in the first and second sockets are implemented as a single domain.

21. The server platform of clause 20, wherein each of the first and second sockets include one or more expansion slots in which a respective MIC device is installed, and wherein each socket further includes software instructions configured to be executed on the host processor of that socket and a plurality of the processor cores in one or more MIC devices installed in one or more respective expansion slots for the socket to enable each socket to:

configure the host processor in the socket as a source and at least a portion of the plurality of processor cores in the MIC device as sinks;

configure, for each MIC device installed an expansion slot for the socket, memory mappings between the on-board MIC memory and the host memory;

manage execution of a job comprising executable code on the host processor;

offload sections of the executable code to the plurality of sinks;

transmit for storage on a non-volatile storage device assessable via a network coupled to the network adaptor, for each section of code that is offloaded to a sink, offload context information identifying the section of code that is offloaded and the sink it is offloaded to;

execute the offloaded code section on the sinks to generate result data;

store the result data in memory buffers accessible to the host processor;

detect that a sink has failed to successfully execute a section of code that was offloaded to the sink, and in response thereto, retrieve the offload context information corresponding to the section of code offloaded to the sink that was previously stored; and offload the section of code to another sink for execution.

22. The server platform of clause 21, wherein the sinks corresponding to the processor cores of the one or more MIC devices installed in the expansion slots of the first socket are implemented in a first domain managed by the first source, and wherein the sinks corresponding to the processor cores of the one or more MIC devices installed in the expansion slots of the second socket are implemented in a second domain managed by the second source.

23. The server platform of clause 22, wherein execution of the software instructions on at least one of the first and second host processors enables the server platform to perform a checkpoint operations under which state information corresponding to respective jobs being executed in parallel on the first and second sockets is written to non-volatile storage accessed via the network adapter.

24. At least one tangible non-transitory machine-readable medium having instructions stored thereon configured to be executed by compute entities in a server platform including,
a host processor comprising a first compute entity;
host memory coupled to the host processor;
a plurality of expansion slots, communicatively-coupled to the host processor;
one or more many integrated core (MIC) devices installed in respective expansion slots, each MIC device including a plurality of processor cores comprising compute entities and on-board memory; and
a network adaptor, installed in either an expansion slot or implemented as a component that is communicatively-coupled to the host processor;
wherein execution of the instructions by the host processor and processor cores in the one or more MIC devices enable the server platform to:
configure the host processor as a source and at least a portion of the plurality of processor cores in the one or more MIC devices as sinks;

configure, for each MIC device, memory mappings between the on-board MIC memory of the MIC device and the host memory;

manage execution of a job comprising executable code on the host processor;

offload sections of the executable code to the plurality of sinks;

transmit for storage on a non-volatile storage device assessable via a network coupled to the network adaptor, for each section of code that is offloaded to a sink, offload context information identifying the section of code that is offloaded and the sink it is offloaded to;

execute the offloaded code section on the sinks to generate result data;

store the result data in memory buffers accessible to the host processor;

detect that a sink has failed to successfully execute a section of code that was offloaded to the sink, and in response thereto, retrieve the offload context information corresponding to the section of code offloaded to the sink that was previously stored; and offload the section of code to another sink for execution.

25. The at least one tangible non-transitory machine-readable medium of clause 24, wherein execution of the instructions by the host processor and processor cores in the one or more MIC devices further enable the server platform to:

execute a first portion of the job via the source;
detect, during execution of the job, a first code section to be offloaded including a one or more first functions;
identify a first sink to offload the first code section to;
construct a first offload context including an address of the first sink, one of the first code section or indicia identifying the one or more first functions, one or more function parameters for the one or more first functions, and information mapping a memory buffer to which result data generated via execution of the one or more first functions is to be written;
transfer the first offload context to the first sink;
store a first offload context object corresponding to the first offload context in non-volatile storage;
execute, via the first sink; the one or more first functions using the one or more function parameters to generate result data;
write the result data to the memory buffer; and
continue execution of the job by the source as if the source executed the first function.

26. The at least one tangible non-transitory machine-readable medium of clause 25, wherein execution of the instructions by the host processor and processor cores in the one or more MIC devices further enable the server platform to:

detect, during execution of the job, a second code section to be offloaded including a second function;
identify a second sink to offload the second code section to;
construct a second offload context including an address of the second sink, one of the second code section or indicia identifying the one or more second functions, one or more function parameters for the one or more second functions, and information mapping a memory buffer to which result data generated via execution of the one or more second functions is to be written;
send the second offload context to the second sink;
store a second offload context object corresponding to the second offload context in non-volatile storage;

one of receive information identifying the second sink has failed, detect the second sink has failed, or detect execution of the second code section on the second sink has resulted in an error, and in response thereto, retrieve the second offload context object from non-volatile storage;

employ the second offload context object to construct a third offload context including an address of a third sink, one of the second code section or indicia identifying the one or more second functions, one or more function parameters for the one or more second functions, and information mapping a memory buffer to which result data generated via execution of the one or more second functions is to be written;

sending the third offload context to the third sink;

storing a third offload context object corresponding to the third offload context in non-volatile storage;

execute, via the first third sink; the one or more section functions using the one or more function parameters to generate result data;

write the result data to the memory buffer; and continue execution of the job by the source as if the source executed the one or more second functions.

27. The at least one tangible non-transitory machine-readable medium of any of clauses 24-26, wherein execution of the instructions by the host processor enables the host processor to detect that a sink has failed to successfully execute a section of code that was offloaded to the sink by using a heartbeat monitoring scheme to determine a sink has failed.

28. The at least one tangible non-transitory machine-readable medium of any of clauses 24-27, wherein execution of the instructions by the host processor enables the host processor to detect that a sink has failed to successfully execute a section of code that was offloaded to the sink by using a timeout timer.

29. A method executing an overall task divided into a plurality of jobs and implemented in a computing environment including a first plurality of compute entities comprising sources commutatively coupled to a second plurality of compute entities comprising sinks, the method comprising:

receiving, at each source, a respective job dispatched to the source, wherein each job comprising executable code;

at each source, managing execution of the job dispatched to the source;

offloading sections of the job's executable code to multiple sinks among the plurality of sinks;

storing, for each section of code that is offloaded to a sink, offload context information identifying the section of code that is offloaded and the sink it is offloaded to;

receiving, for offloaded sections of code, results generated by the sinks to which the sections of code were offloaded;

detecting that a sink has failed to successfully execute a section of code that was offloaded to the sink, and in response thereto, retrieving the offload context information corresponding to the section of code offloaded to the sink; and offloading the section of code to another sink for execution.

30. The method of clause 29, further comprising:

at each source, employing the source to execute the job;

detecting, during execution of the job, a first code section including a one or more first functions to be offloaded to a sink;

constructing a first offload context including an address of a first sink, one of the first code section or indicia identifying the one or more first functions, and one or more function parameters for the one or more first functions;

sending the first offload context to the first sink;

storing a first offload context object corresponding to the first offload context in non-volatile storage;

receiving a first function execution result data produced by the first sink upon execution of the one or more first functions by the first sink; and continuing execution of the job by the source as if the source executed the one or more first functions.

31. The method of clause 30, further comprising:

at each source, detecting, during execution of the job, a second code section including a one or more second functions to be offloaded to a sink;

constructing a second offload context including an address of a second sink, one of the second code section or indicia identifying the one or more section functions, and one or more function parameters for the one or more second functions;

sending the second offload context to the second sink;

storing a second offload context object corresponding to the second offload context in non-volatile storage;

one of receiving information identifying the second sink has failed, detecting the second sink has failed, or detecting the second sink has failed to complete execution of the second code section, and in response thereto, retrieving the second offload context object from non-volatile storage;

employing the second offload context object to construct a third offload context including an address of a third sink, the second code section or indicia identifying the second code section, and the one or more function parameters for the one or more second functions;

sending the third offload context to the third sink;

storing a third offload context object corresponding to the third offload context in non-volatile storage;

receiving a second function execution result data produced by the third sink upon execution of the one or more second functions by the third sink; and continuing execution of the job by the source as if the source executed the one or more second functions.

32. The method of any of clauses 29-31, wherein the plurality of sources are coupled to the plurality of sinks via a network interconnect comprising one or more segments, and the plurality of sinks are implemented as a single domain.

33. The method of any of clauses 29-31, wherein the plurality of sources are coupled to the plurality of sinks via a network interconnect comprising one or more segments, and the plurality of sinks are implemented as multiple domains.

34. The method of clause 33, wherein each source is coupled to a respective set of sinks via a respective network interconnect segment, and wherein each respective set of sinks is implemented in a respective domain.

35. The method of any of clauses 29-31, wherein the plurality of sources are coupled to the plurality of sinks via an offload fabric.

36. The method of clause 35, wherein the plurality of sinks are grouped into a plurality of sets of sinks, wherein each set of sinks is implemented in a respective domain.

37. The method of any of clauses 29-36, wherein the plurality of sources are connected to a job dispatcher via a job dispatch fabric, and wherein the job dispatcher dispatches jobs to the plurality of sources.

38. The method of any of clause 29-36, wherein the plurality of sources are interconnected to one or more job dispatchers, and wherein the one or more job dispatchers, the plurality of sources, and the plurality of sinks occupy respective levels in a hierarchy, with the plurality of sinks occupying the lowest level in the hierarchy.

39. The method of clause 38, wherein the computing environment has a physical hierarchy having a lowest level, and wherein the plurality of sinks comprise compute entities occupying the lowest level of the physical hierarchy, the plurality of sources comprise compute entities occupying a level in the physical hierarchy above the level in the physical hierarchy occupied by the plurality of sinks, and the one or more job dispatchers are implemented by compute entities occupying a level in the physical hierarchy above the level in the physical hierarchy occupied by the plurality of sources.

40. The method of any of clauses 29-39, wherein at least one source comprises a host processor in a server platform and at least a portion of the sinks comprise processor cores in a many integrated core (MIC) device installed in server platform.

41. At least one tangible non-transitory machine-readable medium having instructions stored thereon configured to be executed by the plurality of compute entities to implement the method of any of clauses 29-40.

42. A server platform comprising:
a host processor coupled to host memory;
a plurality of expansion slots, communicatively-coupled to the host processor;
one or more many integrated core (MIC) devices installed in respective expansion slots, each MIC device including a plurality of processor cores and on-board memory; and
a network adaptor, installed in either an expansion slot or implemented as a component that is communicatively-coupled to the host processor; and
means for,
configuring the host processor as a source and at least a portion of the plurality of processor cores in the MIC device as sinks;
configuring memory mappings between the on-board MIC memory and the host memory;
managing execution of a job comprising executable code on the host processor;
offloading sections of the executable code to the plurality of sinks;
transmitting for storage on a non-volatile storage device assessable via a network coupled to the network adaptor, for each section of code that is offloaded to a sink, offload context information identifying the section of code that is offloaded and the sink it is offloaded to;
executing the offloaded code section on the sinks to generate result data;
storing the result data in memory buffers accessible to the host processor;
detecting that a sink has failed to successfully execute a section of code that was offloaded to the sink, and in response thereto,
retrieving the offload context information corresponding to the section of code offloaded to the sink that was previously stored; and
offloading the section of code to another sink for execution.

43. The server platform of clause 42, further comprising means for:
executing a first portion of the job via the source;
detecting, during execution of the job, a first code section to be offloaded including one or more first functions;
identifying a first sink to offload the first code section to;
constructing a first offload context including an address of the first sink, one of the first code section or indicia identifying the one or more first functions, one or more function parameters for the one or more first functions, and information mapping a memory buffer to which result data generated via execution of the one or more first functions is to be written;
transferring the first offload context to the first sink;
storing a first offload context object corresponding to the first offload context in non-volatile storage;
executing, via the first sink; the one or more first functions using the one or more function parameters to generate result data;
writing the result data to the memory buffer; and
continuing execution of the job by the source as if the source executed the first function.

44. The server platform of clause 43, further comprising means for:
detect, during execution of the job, a second code section to be offloaded including a one or more second functions;
identify a second sink to offload the second code section to;
construct a second offload context including an address of the second sink, one of the second code section or indicia identifying the one or more second functions, one or more function parameters for the one or more second functions, and information mapping a memory buffer to which result data generated via execution of the one or more second functions is to be written;
send the second offload context to the second sink;
store a second offload context object corresponding to the second offload context in non-volatile storage;
detecting the second sink has failed, or detecting the second sink has failed to complete execution of the second code section, and in response thereto
one of receive information identifying the second sink has failed, detect the second sink has failed or detect execution of the second code section on the second sink has resulted in an error, and in response thereto,
retrieve the second offload context object from non-volatile storage;
employ the second offload context object to construct a third offload context including an address of a third sink, one of the second code section or indicia identifying the one or more second functions, one or more function parameters for the one or more second functions, and information mapping a memory buffer to which result data generated via execution of the one or more second functions is to be written;
sending the third offload context to the third sink;
storing a third offload context object corresponding to the third offload context in non-volatile storage;
execute, via the first third sink; the one or more section functions using the one or more function parameters to generate result data;
write the result data to the memory buffer; and
continue execution of the job by the source as if the source executed the one or more second functions.

45. The system of clause 44, further comprising means for implementing a heartbeat monitor scheme to detect failure of a sink.

46. The system of clause 44 or 45, further comprising means for implementing a timeout timer to detect execution of the second code section on the second sink has resulted in an error.

47. The server platform of any of clauses 14-18, wherein the server platform comprises a dual-socket server including first and second sockets, wherein each socket includes a respective host processor coupled to respective host memory and at least one expansion slot communicatively-coupled to the host processor, and wherein the host processor and host memory of clause 42 comprises a first host processor and first host memory in the first socket.

48. The server platform of clause 47, wherein each of the first and second sockets include one or more expansion slots in which a respective MIC device is installed, and wherein the sinks in the processor cores of the MIC devices installed in the expansion slots in the first and second sockets are implemented as a single domain.

49. The server platform of clause 48, wherein each of the first and second sockets include one or more expansion slots in which a respective MIC device is installed, further comprising means for, for each of the first and second sockets:

configuring the host processor in the socket as a source and at least a portion of the plurality of processor cores in the MIC device as sinks;

configuring, for each MIC device installed an expansion slot for the socket, memory mappings between the on-board MIC memory and the host memory;

managing execution of a job comprising executable code on the host processor;

offloading sections of the executable code to the plurality of sinks;

transmitting for storage on a non-volatile storage device assessable via a network coupled to the network adaptor, for each section of code that is offloaded to a sink, offload context information identifying the section of code that is offloaded and the sink it is offloaded to;

executing the offloaded code section on the sinks to generate result data;

storing the result data in memory buffers accessible to the host processor;

detecting that a sink has failed to successfully execute a section of code that was offloaded to the sink, and in response thereto, retrieving the offload context information corresponding to the section of code offloaded to the sink that was previously stored; and offloading the section of code to another sink for execution.

50. The server platform of clause 49, wherein the sinks corresponding to the processor cores of the one or more MIC devices installed in the expansion slots of the first socket are implemented in a first domain managed by the first source, and wherein the sinks corresponding to the processor cores of the one or more MIC devices installed in the expansion slots of the second socket are implemented in a second domain managed by the second source.

51. The server platform of clause 50, further comprising means for performing a checkpoint operations under which state information corresponding to respective jobs being executed in parallel on the first and second sockets is written to non-volatile storage accessed via the network adapter.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Italicized letters, such as 'i', 'j', 'l', 'm', 'n', 'p', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented in a computing environment including a compute entity comprising a source commutatively coupled to a plurality of compute entities comprising sinks, the method comprising:
   managing, using the source, execution of a job comprising executable code;
   employing the source to execute the job;
   detecting, during execution of the job, sections of the executable code to be offloaded to sinks, each comprising a respective code section including a one or more functions to be offloaded to a sink;
   constructing, for each code section to be offloaded to a sink, offload context information identifying one of the code section or indicia identifying the one or more functions and information identifying the sink;
   offloading the code sections to the plurality of sinks;
   storing, for each code section that is offloaded to a sink, the offload context information constructed for that code section;
   receiving, for offloaded code sections, results generated by the sinks to which the code sections were offloaded;
   detecting that a sink has failed to successfully execute a code section that was offloaded to the sink, and in response thereto,
      retrieving the offload context information corresponding to the code section offloaded to the sink; and
      offloading the code section to another sink for execution.

2. The method of claim 1, further comprising:
   detecting, during execution of the job, a first code section including a one or more first functions to be offloaded to a sink;
   constructing a first offload context including an address of a first sink, one of the first code section or indicia identifying the one or more first functions, and one or more function parameters for the one or more first functions;
   sending the first offload context to the first sink;
   storing a first offload context object corresponding to the first offload context in non-volatile storage;
   receiving a first function execution result data produced by the first sink upon execution of the one or more first functions by the first sink; and
   continuing execution of the job by the source as if the source executed the one or more first functions.

3. The method of claim 2, further comprising:
   detecting, during execution of the job, a second code section including a one or more second functions to be offloaded to a sink;
   constructing a second offload context including an address of a second sink, one of the second code section or indicia identifying the one or more section functions, and one or more function parameters for the one or more second functions;
   sending the second offload context to the second sink;
   storing a second offload context object corresponding to the second offload context in non-volatile storage;
   receiving information identifying the second sink has failed, detecting the second sink has failed, or detecting the second sink has failed to complete execution of the second code section, and in response thereto,
      retrieving the second offload context object from non-volatile storage;

employing the second offload context object to construct a third offload context including an address of a third sink, the second code section or indicia identifying the second code section, and the one or more function parameters for the one or more second functions;

sending the third offload context to the third sink;

storing a third offload context object corresponding to the third offload context in non-volatile storage;

receiving a second function execution result data produced by the third sink upon execution of the one or more second functions by the third sink; and continuing execution of the job by the source as if the source executed the one or more second functions.

4. The method of claim 2, wherein the first offload context includes information identifying a memory buffer to which the first function result is to be written, and wherein the sink writes the first function result to the memory buffer.

5. The method of claim 4, further comprising:

setting up a Remote Direct Memory Access (RDMA) mechanism between the source and the first sink; and employing an RDMA write to write the first function result directly to the memory buffer.

6. The method of claim 2, further comprising:

distributing a library containing the one or more first functions to the first sink or a host device in which the first sink is implemented in advance of executing the job; and including indicia in the first offload context identifying what library functions to execute.

7. The method of claim 1, wherein detecting that a sink has failed to successfully execute a code section that was offloaded to the sink is detected by using a heartbeat monitoring scheme to determine a sink has failed.

8. The method of claim 1, wherein detecting that a sink has failed to successfully execute a code section that was offloaded to the sink is detected by using a timeout timer.

9. The method of claim 1, wherein the source comprises a host processor in a server platform and at least a portion of the sinks comprise processor cores in a many integrated core (MIC) device installed in server platform.

10. The method of claim 1, wherein the source comprises a server platform in which multiple many integrated core (MIC) devices are installed, and the sinks comprise processor cores in the multiple MIC devices.

11. The method of claim 1, wherein the compute entities corresponding to each of the source and the sinks comprise at least one of server blades and server modules in one or more sleds or chassis in a rack.

12. A server platform comprising:

a host processor coupled to host memory;

a plurality of expansion slots, communicatively-coupled to the host processor;

one or more many integrated core (MIC) devices installed in respective expansion slots, each MIC device including a plurality of processor cores and on-board memory; and a network adaptor, installed in either an expansion slot or implemented as a component that is communicatively-coupled to the host processor;

wherein the server platform further includes software instructions configured to be executed on the host processor and a plurality of the processor cores in the MIC device to enable the server platform to:

configure the host processor as a source and at least a portion of the plurality of processor cores in the MIC device as sinks;

configure memory mappings between the on-board MIC memory and the host memory;

manage execution of a job comprising executable code on the host processor;

employ the source to execute the job;

detect, during execution of the job, sections of the executable code to be offloaded to sinks, each comprising a respective code section including a one or more functions to be offloaded to a sink;

construct, for each code section to be offloaded to a sink, offload context information identifying one of the code section or indicia identifying the one or more functions and information identifying the sink;

offload the code sections to the plurality of sinks;

transmit for storage on a non-volatile storage device accessible via a network coupled to the network adaptor, for each code section that is offloaded to a sink, offload context information identifying the code section that is offloaded and the sink it is offloaded to;

execute the offloaded code section on the sinks to generate result data;

store the result data in memory buffers accessible to the host processor;

detect that a sink has failed to successfully execute a code section that was offloaded to the sink, and in response thereto, retrieve the offload context information corresponding to the code section offloaded to the sink that was previously stored; and offload the of code section to another sink for execution.

13. The server platform of claim 12, wherein execution of the instructions further enables the server platform to:

execute a first portion of the job via the source;

detect, during execution of the job, a first code section to be offloaded including one or more first functions;

identify a first sink to offload the first code section to;

construct a first offload context including an address of the first sink, one of the first code section or indicia identifying the one or more first functions, one or more function parameters for the one or more first functions, and information mapping a memory buffer to which result data generated via execution of the one or more first functions is to be written;

transfer the first offload context to the first sink;

store a first offload context object corresponding to the first offload context in non-volatile storage;

execute, via the first sink; the one or more first functions using the one or more function parameters to generate result data;

write the result data to the memory buffer; and continue execution of the job by the source as if the source executed the first function.

14. The server platform of claim 13, wherein execution of the instructions further enables the server platform:

detect, during execution of the job, a second code section to be offloaded including a one or more second functions;

identify a second sink to offload the second code section to;

construct a second offload context including an address of the second sink, one of the second code section or indicia identifying the one or more second functions, one or more function parameters for the one or more second functions, and information mapping a memory buffer to which result data generated via execution of the one or more second functions is to be written;

send the second offload context to the second sink;

store a second offload context object corresponding to the second offload context in non-volatile storage;

detecting the second sink has failed, or detecting the second sink has failed to complete execution of the second code section, and in response thereto one of receive information identifying the second sink has failed, detect the second sink has failed or detect execution of the second code section on the second sink has resulted in an error, and in response thereto, retrieve the second offload context object from non-volatile storage;

employ the second offload context object to construct a third offload context including an address of a third sink, one of the second code section or indicia identifying the one or more second functions, one or more function parameters for the one or more second functions, and information mapping a memory buffer to which result data generated via execution of the one or more second functions is to be written;

sending the third offload context to the third sink;

storing a third offload context object corresponding to the third offload context in non-volatile storage;

execute, via the third sink; the one or more section functions using the one or more function parameters to generate result data;

write the result data to the memory buffer; and continue execution of the job by the source as if the source executed the one or more second functions.

15. The system of claim 14, wherein the system is further configured to implement a heartbeat monitor scheme to detect failure of a sink.

16. The system of claim 14, wherein the system is further configured to implement a timeout timer to detect execution of the second code section on the second sink has resulted in an error.

17. The server platform of claim 12, wherein the server platform comprises a dual-socket server including first and second sockets, wherein each socket includes a respective host processor coupled to respective host memory and at least one expansion slot communicatively-coupled to the host processor, and wherein the host processor and host memory of claim 12 comprises a first host processor and first host memory in the first socket.

18. The server platform of claim 17, wherein each of the first and second sockets include one or more expansion slots in which a respective MIC device is installed, and wherein the sinks in the processor cores of the MIC devices installed in the expansion slots in the first and second sockets are implemented as a single domain.

19. The server platform of claim 17, wherein each of the first and second sockets include one or more expansion slots in which a respective MIC device is installed, and wherein each socket further includes software instructions configured to be executed on the host processor of that socket and a plurality of the processor cores in one or more MIC devices installed in one or more respective expansion slots for the socket to enable each socket to:

configure the host processor in the socket as a source and at least a portion of the plurality of processor cores in the MIC device as sinks;

configure, for each MIC device installed an expansion slot for the socket, memory mappings between the on-board MIC memory and the host memory;

manage execution of a job comprising executable code on the host processor;

offload the code sections to the plurality of sinks;

transmit for storage on a non-volatile storage device accessible via a network coupled to the network adaptor, for each code section that is offloaded to a sink, offload context information identifying the code section that is offloaded and the sink it is offloaded to;

execute the offloaded code section on the sinks to generate result data;

store the result data in memory buffers accessible to the host processor;

detect that a sink has failed to successfully execute a code section that was offloaded to the sink, and in response thereto, retrieve the offload context information corresponding to the code section offloaded to the sink that was previously stored; and offload the code section to another sink for execution.

20. The server platform of claim 17, wherein the sinks corresponding to the processor cores of the one or more MIC devices installed in the expansion slots of the first socket are implemented in a first domain managed by the first source, and wherein the sinks corresponding to the processor cores of the one or more MIC devices installed in the expansion slots of the second socket are implemented in a second domain managed by the second source.

21. The server platform of claim 20, wherein execution of the software instructions on at least one of the first and second host processors enables the server platform to perform a checkpoint operations under which state information corresponding to respective jobs being executed in parallel on the first and second sockets is written to non-volatile storage accessed via the network adapter.

22. At least one tangible non-transitory machine-readable medium having instructions stored thereon configured to be executed by compute entities in a server platform including, a host processor comprising a first compute entity;

host memory coupled to the host processor;

a plurality of expansion slots, communicatively-coupled to the host processor;

one or more many integrated core (MIC) devices installed in respective expansion slots, each MIC device including a plurality of processor cores comprising compute entities and on-board memory; and a network adaptor, installed in either an expansion slot or implemented as a component that is communicatively-coupled to the host processor;

wherein execution of the instructions by the host processor and processor cores in the one or more MIC devices enable the server platform to:

configure the host processor as a source and at least a portion of the plurality of processor cores in the one or more MIC devices as sinks;

configure, for each MIC device, memory mappings between the on-board MIC memory of the MIC device and the host memory;

manage execution of a job comprising executable code on the host processor;

employ the source to execute the job;

detect, during execution of the job, sections of the executable code to be offloaded to sinks, each comprising a respective code section including a one or more functions to be offloaded to a sink;

construct, for each code section to be offloaded to a sink, offload context information identifying one of the code section or indicia identifying the one or more functions and information identifying the sink;
offload the code sections to the plurality of sinks;
transmit for storage on a non-volatile storage device accessible via a network coupled to the network adaptor, for each code section that is offloaded to a sink, offload context information identifying the code section that is offloaded and the sink it is offloaded to;
execute the offloaded code section on the sinks to generate result data;
store the result data in memory buffers accessible to the host processor;
detect that a sink has failed to successfully execute a code section that was offloaded to the sink, and in response thereto,
retrieve the offload context information corresponding to the code section offloaded to the sink that was previously stored; and
offload the code section to another sink for execution.

23. The at least one tangible non-transitory machine-readable medium of claim 22, wherein execution of the instructions by the host processor and processor cores in the one or more MIC devices further enable the server platform to:
execute a first portion of the job via the source;
detect, during execution of the job, a first code section to be offloaded including a one or more first functions;
identify a first sink to offload the first code section to;
construct a first offload context including an address of the first sink, one of the first code section or indicia identifying the one or more first functions, one or more function parameters for the one or more first functions, and information mapping a memory buffer to which result data generated via execution of the one or more first functions is to be written;
transfer the first offload context to the first sink;
store a first offload context object corresponding to the first offload context in non-volatile storage;
execute, via the first sink; the one or more first functions using the one or more function parameters to generate result data;
write the result data to the memory buffer; and
continue execution of the job by the source as if the source executed the first function.

24. The at least one tangible non-transitory machine-readable medium of claim 23, wherein execution of the instructions by the host processor and processor cores in the one or more MIC devices further enable the server platform to:
detect, during execution of the job, a second code section to be offloaded including a second function;
identify a second sink to offload the second code section to;
construct a second offload context including an address of the second sink, one of the second code section or indicia identifying the one or more second functions, one or more function parameters for the one or more second functions, and information mapping a memory buffer to which result data generated via execution of the one or more second functions is to be written;
send the second offload context to the second sink;
store a second offload context object corresponding to the second offload context in non-volatile storage;
one of receive information identifying the second sink has failed, detect the second sink has failed, or detect execution of the second code section on the second sink has resulted in an error, and in response thereto,
retrieve the second offload context object from non-volatile storage;
employ the second offload context object to construct a third offload context including an address of a third sink, one of the second code section or indicia identifying the one or more second functions, one or more function parameters for the one or more second functions, and information mapping a memory buffer to which result data generated via execution of the one or more second functions is to be written;
sending the third offload context to the third sink;
storing a third offload context object corresponding to the third offload context in non-volatile storage;
execute, via the third sink; the one or more section functions using the one or more function parameters to generate result data;
write the result data to the memory buffer; and
continue execution of the job by the source as if the source executed the one or more second functions.

25. The at least one tangible non-transitory machine-readable medium of claim 22, wherein execution of the instructions by the host processor enable the host processor to detect that a sink has failed to successfully execute a code section that was offloaded to the sink by using a heartbeat monitoring scheme to determine a sink has failed.

* * * * *